(12) United States Patent
Tran

(10) Patent No.: US 12,284,025 B2
(45) Date of Patent: Apr. 22, 2025

(54) MOBILE SATELLITE COMMUNICATION SYSTEM

(71) Applicant: Bao Tran, Saratoga, CA (US)

(72) Inventor: Bao Tran, Saratoga, CA (US)

(*) Notice: Subject to any disclaimer, the term of this patent is extended or adjusted under 35 U.S.C. 154(b) by 496 days.

(21) Appl. No.: 17/741,655

(22) Filed: May 11, 2022

(65) Prior Publication Data

US 2023/0370158 A1 Nov. 16, 2023

(51) Int. Cl.
| | |
|---|---|
| H04B 7/185 | (2006.01) |
| H01Q 1/08 | (2006.01) |
| H01Q 1/24 | (2006.01) |
| H01Q 1/27 | (2006.01) |
| H01Q 1/28 | (2006.01) |
| H01Q 1/42 | (2006.01) |
| H01Q 3/04 | (2006.01) |
| H02S 10/40 | (2014.01) |
| H01Q 19/19 | (2006.01) |

(52) U.S. Cl.
CPC ......... *H04B 7/18517* (2013.01); *H01Q 1/081* (2013.01); *H01Q 1/243* (2013.01); *H01Q 1/273* (2013.01); *H01Q 1/28* (2013.01); *H01Q 1/42* (2013.01); *H01Q 3/04* (2013.01); *H02S 10/40* (2014.12); *H04B 7/1858* (2013.01); *H01Q 19/19* (2013.01)

(58) Field of Classification Search
CPC .. H04B 7/18517; H04B 7/1858; H01Q 1/081; H01Q 1/243; H01Q 1/273; H01Q 1/28; H01Q 1/42; H01Q 3/04; H01Q 19/19; H01Q 3/26; H01Q 15/163; H01Q 1/27; H01Q 19/062; H01Q 19/10; H02S 10/40
See application file for complete search history.

(56) References Cited

U.S. PATENT DOCUMENTS

| | | |
|---|---|---|
| 6,388,621 B1 | 5/2002 | Lynch |
| 6,653,981 B2 | 11/2003 | Wang |
| 7,042,408 B2 | 5/2006 | Peng |
| 7,227,508 B2 | 6/2007 | Wang |
| 7,839,348 B2 | 11/2010 | Baker |
| 7,974,571 B2 | 7/2011 | Dankberg |
| 9,391,373 B2 | 7/2016 | Ehrenberg |
| 10,700,444 B2 | 6/2020 | Chou |
| 10,708,640 B2 | 7/2020 | Chen |
| 10,770,790 B1 | 9/2020 | Mahanfar |
| 10,843,822 B1 | 11/2020 | Herman |
| 10,938,465 B1 | 3/2021 | Mehrnia |
| 2007/0001914 A1 | 1/2007 | Robnett |
| 2008/0210728 A1 | 9/2008 | Bihn |
| 2016/0170029 A1* | 6/2016 | Wyler ............... H01Q 3/36 342/354 |
| 2018/0164441 A1* | 6/2018 | Feria ................ H01Q 21/22 |

(Continued)

OTHER PUBLICATIONS

Campersat brochure Jul. 2009.
Gordon, Criteria for choosing transparent conductors, MRS bulletin, Aug. 2000 pp. 52-58.

*Primary Examiner* — Christopher M Brandt

(74) *Attorney, Agent, or Firm* — PatentPC PowerPatent

(57) ABSTRACT

A global communication system includes a mobile portion; a phased-array antenna attached to the mobile portion; an actuator to move the antenna in one direction to face a satellite; a transceiver to communicate with the satellite; and a processor controlling the actuator to optimize communication from the transceiver.

20 Claims, 13 Drawing Sheets

(56) References Cited

U.S. PATENT DOCUMENTS

| | | | |
|---|---|---|---|
| 2018/0269576 A1* | 9/2018 | Scarborough | H01Q 21/0025 |
| 2019/0103952 A1 | 4/2019 | Goudal | |
| 2019/0252774 A1 | 8/2019 | De Luis | |
| 2019/0280387 A1 | 9/2019 | Posthuma | |
| 2020/0076503 A1* | 3/2020 | Croughwell, III | H04B 10/116 |
| 2020/0212995 A1* | 7/2020 | Lu | H04B 7/18515 |
| 2020/0295469 A1* | 9/2020 | Fenn | H01Q 19/19 |
| 2020/0374383 A1* | 11/2020 | McGarvey | H04W 4/14 |
| 2020/0381815 A1 | 12/2020 | Milroy | |
| 2020/0382206 A1 | 12/2020 | Adams | |
| 2022/0155817 A1* | 5/2022 | Woods, Jr. | H01Q 3/2658 |

\* cited by examiner

OUTER SURFACE

HEX MESH

ANTENNA

BASE

HEX MESH

ANTENNA

SUBSTRATE

MOBILE SATELLITE COMMUNICATION SYSTEM

BACKGROUND

Communication satellites receive and transmit radio signals from and to the surface of Earth for providing communication services. Communication systems can deploy non-geostationary satellites singly or as a constellation. Geostationary-Earth orbit (GEO) satellites orbit the equator with an orbital period of one day at a high altitude. A GEO orbit is a circular orbit 35,786 km (22,236 mi) above Earth's equator and following the direction of Earth's rotation. An object in GEO orbit has an orbital period equal to the Earth's rotational period. Therefore, to ground observers, the satellite appears motionless at a fixed position in the sky. In contrast, non-geostationary satellites typically operate in low-Earth or mid-Earth orbit (LEO or MEO) and do not remain stationary relative to a specific location on Earth. Generally, one or more satellites travel along a known trajectory with a predetermined direction while emitting and receiving RF signals to and from an antenna system and the satellites traveling along a repeating ground track. With phased array antennas, when the satellite trajectory is synchronized and repeating with the surface of the Earth, the orientation of the communicating RF signal with respect to the receiving and transmitting phased array antennas on the Earth is determinable.

The IDS references, including issued United States patents, pending US patents, and other references are identified herein to assist the reader in understanding the context in which the invention is made, some of the distinctions of the inventive structures and methods over that which was known prior to the invention, and advantages of this new invention, the entire contents of which being incorporated herein by reference. This list is intended to be illustrative rather than exhaustive.

All publications including patents, pending patents, documents, published papers, articles and reports contained, listed or cited in these mentioned publications and/or in this disclosure—patent/invention are herein incorporated by reference to the same extent as if each publication or report, or patent or pending patent and/or references listed in these publications, reports, patents or pending patents were specifically and individually indicated to be incorporated by reference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A mobile satellite/cellular communication is described. Implementations include systems mounted on a backpack portion, a vehicle portion, a moveable tent portion, a cell phone, a personal communicator, a hat, a watch, skin, clothing, or a wearable portion, and other moveable platforms.

In one aspect, a communication system includes: an antenna mounted on a mobile housing; a satellite transceiver to communicated with one or more satellites; a motor or actuator to unidirectionally move the antenna to track the one or more satellites to communicate phased-array RF signals; and a local transceiver to communicate data to a local transceiver. Other aspects are detailed below.

Advantages of the system may include one or more of the following. The system enables mobile communications globally on Earth, a capability referred to as universal or global coverage. In addition to global coverage, some locations on Earth, such as densely populated areas, require more communication capacity than others, and the bonding of satellite channels increases data capacity/speed. The system improves signal quality (e.g., signal to noise ratio or SNR), whether in transmitting or receiving scenarios, by aligning the preferred direction of the antenna with a direction of the target or source of signal. The vehicle mounted satellite antenna is operable while the vehicle is in motion. The antenna has a low profile. The antenna has high gain and high efficiency. The vehicle mountable satellite antenna is easy to install.

Figure 1A:
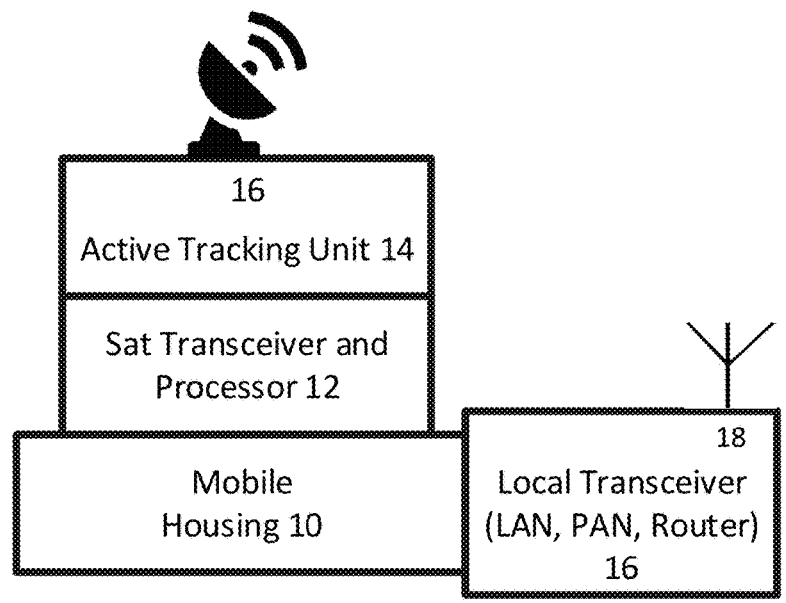
FIG. 1A shows exemplary satellite communication electronics carried in a mobile housing.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

DETAILED DESCRIPTION

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as "top", "bottom", "upper", "lower", "vertical", "horizontal", "lateral", in the present disclosure is meant to provide orientation for the reader with reference to the drawings and is not intended to be the required orientation of the components or to impart orientation limitations into the claims.

FIG. 1A shows an exemplary global satellite communication (global comm) system that includes a mobile housing 10, communication transceivers and processing logic 12, an active tracking unit 14 with moveable antenna 16 to improve RF reception. When the path of the incoming satellite RF beam is known in advance, as is the case with the satellite constellation that travels along repeating or synchronized ground tracks, the gain enhancement system can be configured to focus (direct or "steer") the incoming RF radiation onto a set of antenna elements. As a result, the intensity of the RF signal increases at these antenna elements in one direction. Therefore, phase offsets to individual antenna elements in this direction can be reduced by using the gain enhancement system. The system uses one motor to mechanically move the phased array antenna in one dimension and communicate with a satellite constellation that emits or receives radio frequency (RF) signals and has a repeating ground track in a first direction. The method includes: identifying a repeating ground track of the satellite constellation in a first direction; orienting a phased array antenna in the first direction, the antenna including a plurality of antenna elements distributed in a plurality of M columns oriented in the first direction and a plurality of N rows extending in a second direction normal to the first direction, and a plurality of phase shifters aligned for phase offsets between antenna elements in the first direction; enhancing gain in the second direction of radio frequency signals received by and emitted from the phased array antenna; and receiving and/or emitting RF signals between the satellite constellation and the antenna.

A signal may be received at the satellite antenna 14. The signal may be filtered and passed through a low noise amplifier (LNA). The signal may be down-converted, and the signal may contain data for multiple users and may require demultiplexing. For example, data may be channelized using time division multiple access, frequency division multiple access, spread spectrum multiple access, code division multiple access, space division multiple access, wavelength division multiple access and/or multi-frequency time division multiple access. Data may be packetized within the signal. For example, data may be packetized using the following packetization techniques: aloha, slotted aloha, multiple access with collision avoidance, multiple access with collision avoidance for wireless, carrier sense multiple access, carrier sense multiple access with collision detection, carrier sense multiple access with collision avoidance, distributed coordination function, point coordination function, carrier sense multiple access with collision avoidance and resolution using priorities, token passing, token ring, token bus, polling resource reservation (scheduled) packet-mode protocols, dynamic time division multiple access, packet reservation multiple access, and/or reservation aloha.

Data can be routed at the router. For wireless devices connected with the wireless satellite communication device with the local antenna, the router 125 may route data with the local antenna to the connected wireless device. Data intended for other devices are dropped at the router. The router as shown is coupled with a LAN controller for WiFi and PAN/Bluetooth transceiver. The controller may also be coupled with various other components of the wireless satellite communication device. Data intended for connected wireless devices is multiplexed according to the local multiplexing scheme at the multiplexer. For example, if the local antenna is configured to transmit using Wi-Fi, then the data may be multiplexed according to the IEEE 802.11 standard. This may include, for example, the combination of single carrier direct-sequence spread spectrum techniques and/or multi-carrier orthogonal frequency division multiplexing. Various other multiple access or multiplexing techniques may be used. The data may be upconverted, amplified and filtered and then be transmitted to various users with the local antenna. While the above description describes the flow of data from a satellite antenna to a user through a local antenna, data may also be received at the local antenna and transmitted to a satellite through the satellite antenna. Those skilled in the art will recognize that the system may send and/or receive data at either and/or both antennas.

The local antenna may wirelessly communicate with electrical systems such as, for example, an in-car computer, a radio, time-traffic displays, weather displays, law enforcement and/or health and safety computers or systems, global positioning systems, telemetry systems, mobile phones, gaming devices, computers, televisions, smart phones, iPhones, monitors, weather systems, etc. The local antenna may communicate with any short distance wireless standard such as, for example, Wireless USB, VOIP, LNA, Wi-Fi, Bluetooth, ZigBee, WLAN, IRDa, etc. Moreover, the local antenna may simultaneously communicate with multiple devices in multiple standards.

The wireless satellite communication device may act as a satellite wireless access point. A wireless access point is typically a device that connects wireless communication devices together to form a wireless network. Some wireless access points are connected with a wired network, and can relay data between wireless devices and a wired network. According to embodiments of the invention, the wireless satellite communication device may act as a satellite wireless access point insofar as the wireless satellite communication device relays data between wireless devices and a satellite network. Moreover, the wireless satellite communication device may perform switching between multiple wireless devices or be a bent-pipe.

The transceivers may include, but is not limited to, WLAN (e.g., 802.11), WiMAX (Worldwide Interoperability for Microwave Access), TransferJet, 3GPP LTE (3rd Generation Partnership Project Long Term Evolution), 6G/5G/4G, Time Division LTE (TD LTE), Universal Mobile Telecommunications System (UMTS), Global Standard for Mobile (GSM) communication, General Packet Radio Service (GPRS), enhanced data rates for GSM evolution (EDGE), DCS, PDC, PCS, Code Division Multiple Access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, 2500-2700 MHz, and 5-6 GHz, among others. Other radio access technologies and/or frequency bands can also be used in embodiments according to the inventive concepts. Various embodiments may provide coverage for non-cellular frequency bands such as Global Positioning System (GPS), WLAN, and/or Bluetooth frequency bands. As an example, in various embodiments according to the inventive concepts, the local wireless network is a WLAN compliant network. In various other embodiments according to the inventive concepts, the local wireless network is a Wi-Fi or a Bluetooth compliant interface.

In one aspect, a communication system includes: an antenna mounted on a mobile housing; a satellite transceiver to communicated with one or more satellites; a motor or actuator to unidirectionally move the antenna to track the one or more satellites to communicate phased-array RF signals; and a local transceiver to communicate data to a local transceiver.

Figure 1B:
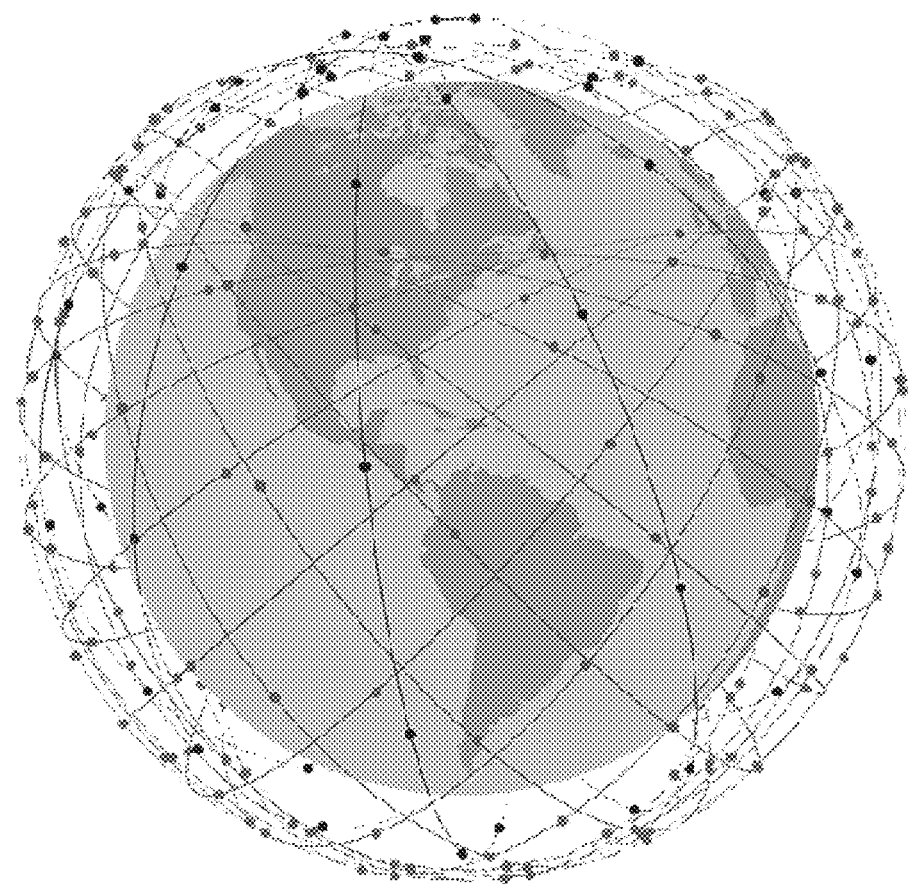
FIGS. 1B-1C show exemplary satellite constellations in communication with the system of FIG. 1A.
Figure 1C:
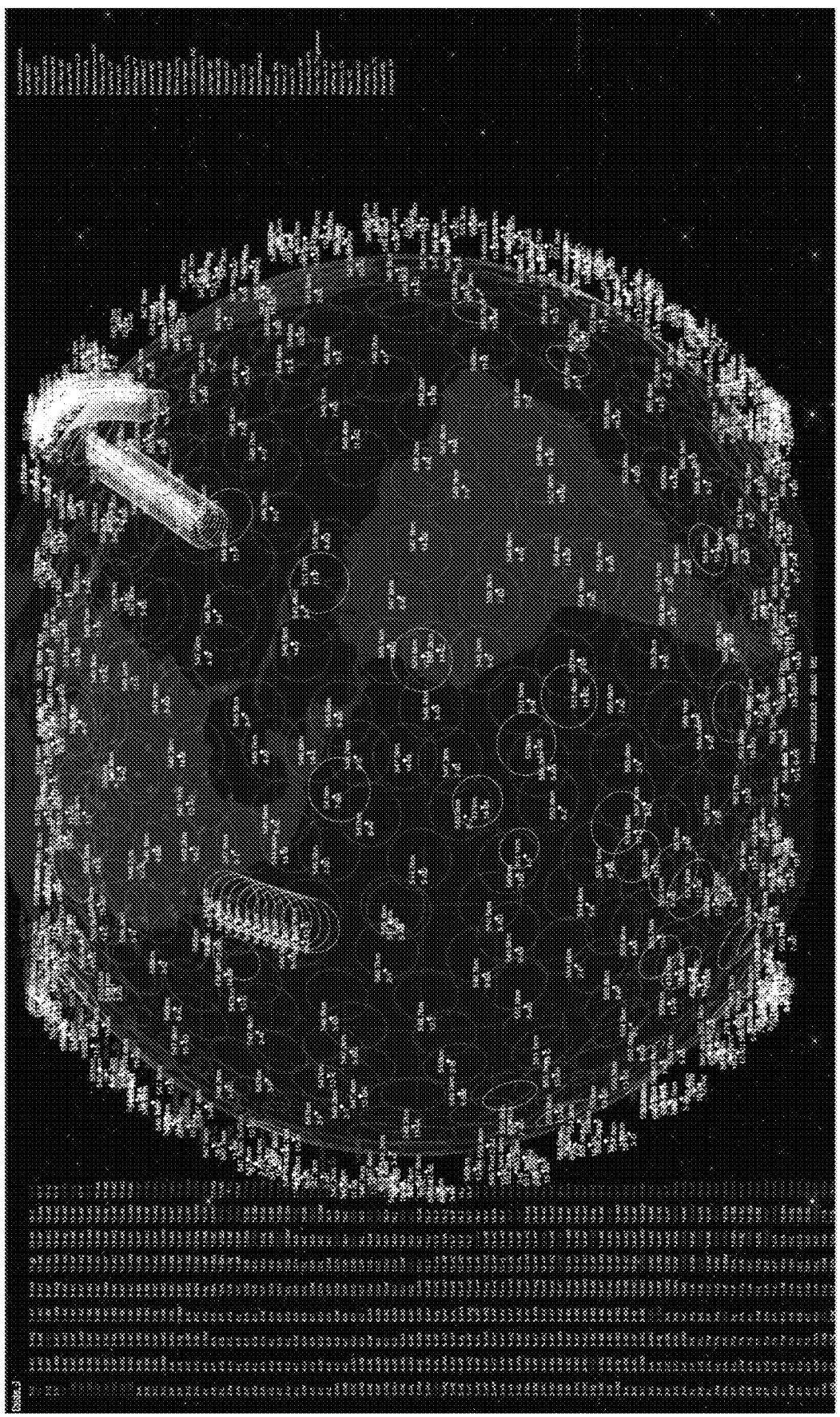

FIGS. 1B-1C show exemplary constellation of satellites from a number of vendors. In 2020 so far, SpaceX has deployed more than 800 Starlink satellites in low Earth orbit with plans to increase this by up to 42,000 with its Starlink constellation, coupled with thousands more from Amazon, OneWeb, and others. Amazon plans to launch 3,200 satellites to form the initial constellation within the next six years. OneWeb plans to launch 650 satellites by the end of 2021 to provide basic global service and an additional 400 satellites to enhance capacity in reception hotspots. In parallel, 5G cellular services are being rolled out, with 6G services under development.

The following additional aspects are operational as stand-alone systems, and can also be mixed with other aspects. The aspects include one or more of the following:

Backpack Satellite Communication

Figure 2A:
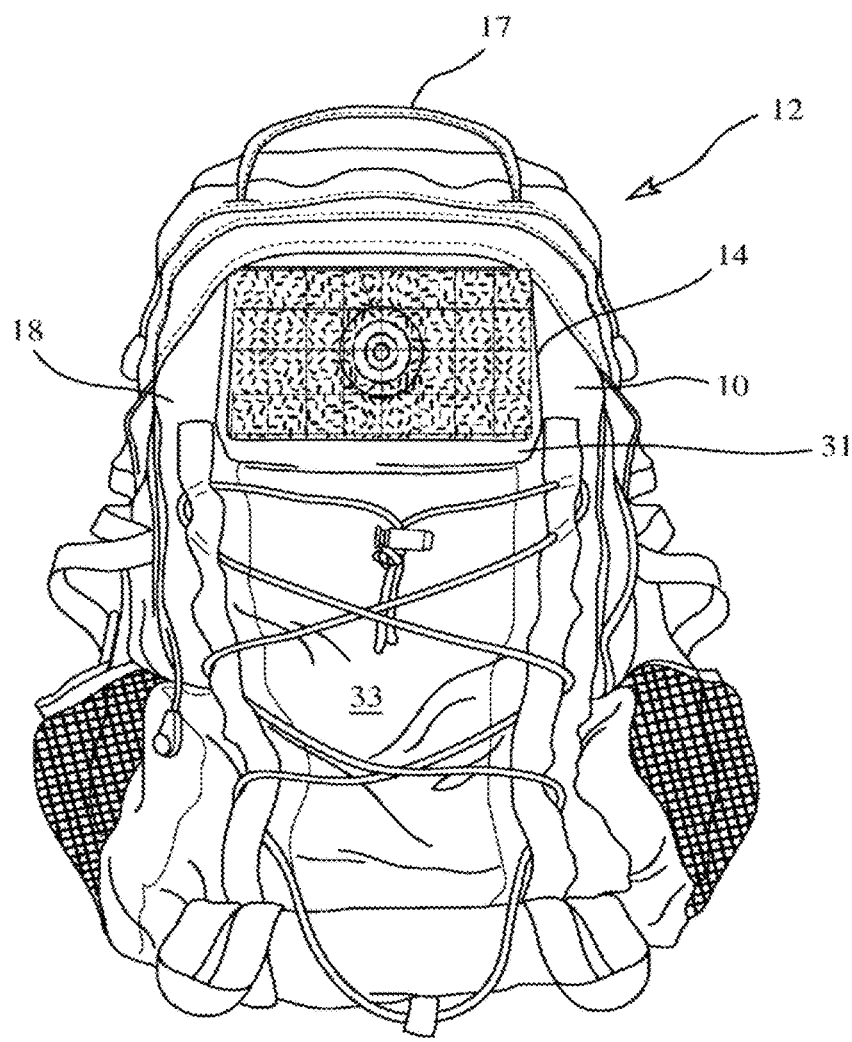
FIG. 2A-2G shows exemplary backpacks with actuated antenna(s) for communicating with one or more satellites.

FIG. 2A shows an exemplary global comm backpack 12 with an actuated (moveable) antenna 14 to improve SNR. The global comm backpack includes a backpack portion 10; an moveable antenna assembly 14 attached to a satellite facing portion of the backpack 12, wherein the antenna panel assembly 14 protrudes at an angle above the front top portion 18 of the solar backpack 12; and electronics in a pocket or recess in the backpack 12. The backpack 12 carries a power source such as a battery, hydrogen fuel cell, or a solar panel. Alternatively, an energy scavenging device can be used to supply power to the backpack electronics. There may be an interchangeable battery recharge cord in electrical communication with the battery for recharging at least one external apparatus. The antenna 14 may have an angled flap 31 for supporting the solar panel assembly 14 above the front 33 of the backpack. The backpack, as shown has a top handle 17, and backpack straps 5.

Figure 2B:
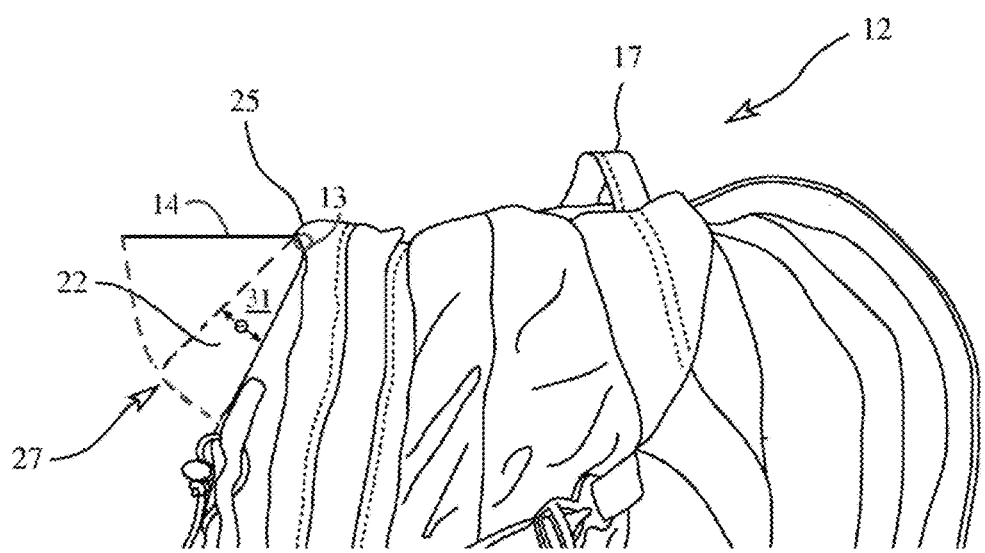

FIG. 2B shows in more details the actuated antenna assembly 14 as rotated by a motor or actuator 13 by an angle 22 to improve RF alignment with the antennas on the satellite constellation. To economize on weight/cost, the antenna 14 can be moved by one motor and thus can move only one dimension. However, multi-axis orientation of the antenna 14 can be done using multiple motors. Such tiltability of the phased array antenna aperture enables orientation of the field of regard with the sky for enhanced radio frequency communication with one or more satellites depending on the geolocation of the phased array antenna aperture and the orbit of the satellite constellation.

The mobile antenna 14 and its operations are described next. In one embodiment, the antenna 14 can be a phased array antenna that electronically steers in one or two directions. A phased array antenna is an electronically scanned array of antenna elements which creates a signal beam that can be electronically steered to point in different directions without moving the antenna elements. The relative amplitudes of and constructive and destructive interference effects among the signals radiated by the individual antennas determine the effective radiation pattern of the array. Therefore, phased array antennas emit RF signals as a main lobe accompanied by side lobes. In a phased array, power from the transmitter is fed to the antennas through phase shifters, which are controlled by a computer system to alter the phase electronically, thus steering the beams to different directions, for example, to add together to increase the radiation in a desired direction, while cancelling to suppress radiation in undesired directions.

Preferably the phased array antenna includes array antenna aperture defined by a lattice of a plurality of antenna elements distributed in, for example, M columns oriented in the first direction and N rows extending in a second direction at an angle relative to the first direction (such as a 90 degree angle in a rectangular lattice or a 60 degree angle in a triangular lattice) configured to transmit and/or receive signals in a preferred direction. The phased array antenna system is configured for communication with a satellite that emits or receives radio frequency (RF) signals, for example, via the Ku band. The antenna elements M×N are arranged in multiple rows and columns can be phase offset such that the phased array antenna emits a waveform in a preferred direction and RF signals are provided to a plurality of phase shifters aligned for phase offsets between antenna elements in the first and second directions. When the phase offsets to individual antenna elements are properly applied, the combined wave front has a desired directivity of the main lobe. At a receiving phased array antenna, the RF wave fronts can be detected by a set of individual antenna elements and amplified by a set of LNAs. The wave fronts may reach the antenna elements at different times. Therefore, the received signal will generally include phase offsets from one antenna element of the receiving (RX) antenna to another. Analogous to the emitting phased array antenna case, these phase offsets can be adjusted—for by another set of phase shifters connected to the respective antenna elements. For example, each phase shifter can adjust the phase of the signal to the same reference, such that the phase offset among the individual antenna elements is canceled in order to combine the RF signals corresponding to the same wave front so that a higher signal to noise ratio (SNR) can be attained on the received signal. Suitable gain enhancements can be used with the antenna to improve signature reception, and they include lenses, reflectors, superstrate grating, and any suitable combinations thereof.

The processor may run a tilt determination angle method that may receive information regarding the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof. The method includes determining the factors of communication for the endpoint terminal include the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof. The processor may at least partially rely on a global positioning system GPS to interpret a spatial relationship between the satellite (s) and the phased array antenna system.

Data may be transmitted in one or both directions. Data from a backpack user device (smart phone and others) may be transmitted to a satellite through a wireless network. A wireless satellite transceiver may communicate the data with a satellite. The satellite in turn may then transfer the data to a gateway connected to the Internet and the data is transferred to the appropriate address on the Internet. The various connections between devices may require different and/or the same channel access schemes and/or packetization schemes. Data may be communicated in the opposite direction from the Internet to the gateway to the satellite to the wireless satellite transceiver to the wireless user device or smart phone. Bandwidth may be allocated proportionally or disproportionally between the uplink and downlink connections from the satellite.

Figure 2C:
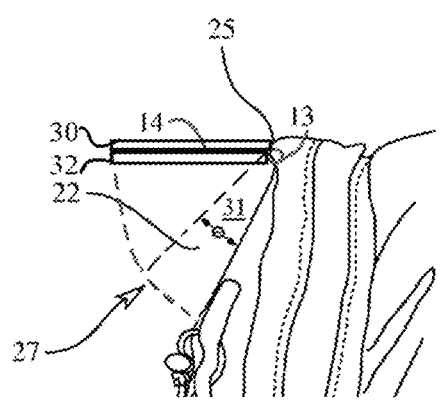
Figure 2D:
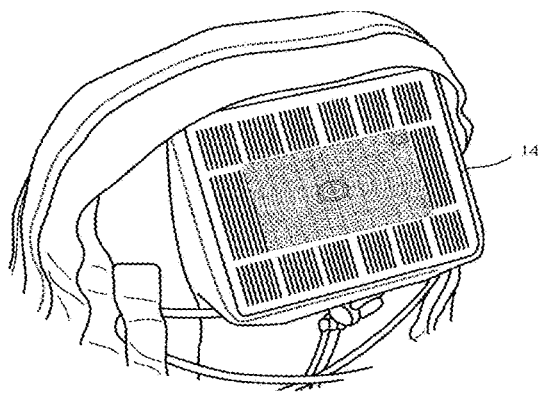

FIG. 2C shows an exemplary RF transparent solar panel 30 above an antenna 32. The solar panel can also be under the antenna if the antenna is made of a solar transparent material, or as shown in FIG. 2D, the solar panel can be coplanar with the antenna 32 (surrounding the antenna 32 as illustrated but this can be on one side of the antenna, for example. The solar panel can be made of an RF transparent material that allows RF signals to pass through the solar panel with minimal loss. When the term "RE reflective" is used herein, it should be understood that the membrane is in actuality substantially RF reflective, reflecting RF energy in an amount that is adequate for the successful performance of the antenna, as opposed to being perfectly reflective. Likewise, when the term "RE transparent" is used herein, it should be understood that the membrane is in actuality substantially RF transparent, allowing RF energy to pass through in an amount that is adequate for the successful performance of the antenna, as opposed to being perfectly transparent.

In one embodiment, the antenna includes two spatially interleaved antenna arrays operable independently to transmit and receive simultaneously at different frequencies. The antenna is coupled to a diplexer such as through one or more feeding networks. For a radial feed antenna, the diplexer combines the two signals and the connection between antenna and diplexer is a single broad-band feeding network that can carry both frequencies. The diplexer drives a low noise block down converter (LNBs), which performs a noise filtering function and a down conversion and amplification function in a manner well-known in the art. The LNB is integrated into the antenna apparatus or can be a separate outdoor unit (such as the car top unit below). LNB is coupled to a modem with an ADC, a demodulator and a decoder, and the modem output is provided to a CPU or a computer. The modem also includes an encoder whose output is modulated by modulator and then converted to DAC. The analog signal is then filtered by a BUC (up-convert and high pass amplifier) and provided to one port of the diplexer.

In one embodiment, the control structure for the antenna system has 2 main components: the antenna array controller, which includes drive electronics, for the antenna system, is below the wave scattering structure (of surface scattering antenna elements such as described herein), while the matrix drive switching array is interspersed throughout the radiating RF array in such a way as to not interfere with the radiation.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system. More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

One embodiment uses a movable antenna and a container to house the antenna, the container having at least one radio-frequency (RF) transparent material through which the antenna is operable to transmit and receive satellite communications. Another embodiment may optionally include that the at least one RF transparent material comprises a lid of the container. Yet another embodiment may optionally include that the lid is operable as a radome of the antenna. The RF transparent material can be plastic or fiberglass, also the transparent material is tuned to frequencies at which the antenna is designed to operate. The system may optionally include that the at least one RF transparent material has a convex shape with respect to a surface of the antenna through which the antenna transmits and receives the satellite communications. An externally exposed portion of the at least one RF transparent material has a hydrophobic coating. In another embodiment, a portable satellite antenna includes a moveable antenna and a container to house the antenna, the container having at least one RF transparent lid through which the antenna is operable to transmit and receive satellite communications, wherein the lid comprises a material that is a predetermined distance from the antenna surface and tuned to frequencies at which the antenna is designed to operate, wherein the antenna is operable to transmit and receive satellite communications through the at least one RF transparent lid for closed-container operation when the container is closed. The material has a thickness that provides a protective shell and structure support for the mobile housing as a transit case while not impeding RF transmission.

In one embodiment, the antenna aperture has one or more arrays of antenna elements that are placed in concentric rings around an input feed of the antenna. In one embodiment, antenna elements are radio frequency (RF) resonators that radiate RF energy. In one embodiment, antenna elements comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance. In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. The system is not limited to having a liquid crystal that operates in a binary fashion with respect to energy transmission.

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The generation of a focused beam by the metamaterial array of elements can be done through constructive and destructive interference. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Radio Frequency ("RF") holography is also possible using analogous techniques where a desired RF beam can be generated when an RF reference beam encounters an RF holographic diffraction pattern. In the case of satellite communications, the reference beam is in the form of a feed wave. To transform a feed wave into a radiated beam (either for transmitting or receiving purposes), an interference pattern is calculated between the desired RF beam (the object beam) and the feed wave (the reference beam). The interference pattern is driven onto the array of tunable slots as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna. In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

When the antenna assembly is first powered up, a microprocessor commands the motors to move and applies motion compensation. The antenna is moved to scan through possible satellite positions to search for a satellite signal. The system scans various angles at a given elevation, incrementally change the angle, and repeat. Preferably, an electronic compass and global positioning system are utilized and the location of the satellite is known. Thus, it will not be necessary to scan the entire hemisphere, but only a relatively small region based on the accuracy of the compass and the satellite position. The antenna dither action is not turned on during the initial satellite location. The antenna controller monitors the RSSI via the power monitor. If the power monitor detects that the signal strength exceeds a certain threshold, the scanning is stopped and the antenna dithering is turned on to allow the antenna to track the signal. A demodulator and the data processor are monitored to see if the antenna are pointed at the desired satellite and if the signal is properly decoded. If that is the case, the signal lock is achieved. Otherwise, the antenna dithering is disabled and the scanning is resumed.

If the signal lock is achieved, the antenna tracking algorithm continues to refine the antenna tracking. The processor which controls the motors continues to report the motor position with a time tag. In the preferred embodiment, the motor position is translated into a satellite position (elevation and azimuth) in space. In the case that the signal is blocked by trees, buildings, or other obstacles, the power monitor and the receive data processor can immediately detect the loss of signal. The antenna tracking algorithm will command the motor controller to move the antenna back to point at the last satellite position recorded, when the satellite signal was properly decoded. In addition, upon loss of signal, the antenna dithering tracking algorithm will be temporarily turned off. If the power monitor detects the signal power (exceeding some threshold) again or the data processor detects the signal lock again, the antenna dithering algorithm will be turned on again to continue tracking. After a certain time-out period if no signal strength exceeding the threshold is detected by the power monitor or the data processor does not detect signal lock, the antenna scanning algorithm will be initiated to scan for signal again. The antenna scanning algorithm for signal re-acquisition will scan in a limited region around the last satellite position recorded, when the satellite signal was properly decoded. If the scanning does not find the satellite signal, a full scan of 360 degrees of azimuth angle and all possible elevation angles will be conducted.

In one aspect, a global communication backpack includes: a backpack portion; at least one antenna attached to the backpack portion; an actuator to move the antenna to face a satellite; transceivers to communicate with the satellite; and a processor controlling the actuator to optimize communication.

Implementations can include:
  the actuator can be motor or hydraulic, or can be inflatable chambers powered by air or a pump.
  a solar panel on or surrounding the antenna. Other options include a battery contained in said backpack portion and in electrical communication with said solar panel assembly or an interchangeable battery recharge cord in electrical communication with said battery for recharging at least one external apparatus.
  assembly.
  portion.
  a plastic cover, wherein said plastic cover is in communication with said solar panel an angled flap can support the antenna/solar panel assembly above the backpack a rain cover to protect said backpack.
  external chargers may be used, such as a car charger and/or DC charger to charge the battery directly. There are also direct adaptors for popular cell phones, and a set of universal adaptors. There may also be an AC travel charger and a car charger for charging the power bank when solar charging is not practical. In addition to these standard items, there are a range of optional adaptors for cell phones, tablets, and smart watches, among others.

Lens or Focusing Devices for the Antenna

Figure 2E:
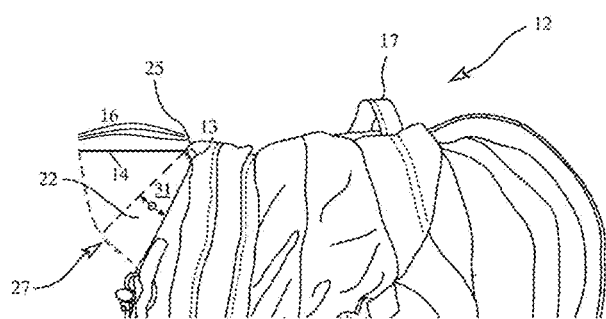

FIG. 2E shows an exemplary lens above the antenna 14 of FIG. 2C.

In one aspect, a lens or electromagnetic (EM) gain device 16 is disposed between the source of the RF signal and the phased array antenna system 14 to direct the main lobe of the RF radiation onto a set of the individual antenna elements. Therefore, in some embodiments of the present disclosure, the number of phase shifters per antenna element can be reduced if phase shifting is only required in one direction of the array of antenna elements instead of in two directions.

In another aspect, the lens or EM gain device can be used for communication with one or more satellites in a satellite constellation traveling along a repeating ground track. In a two-dimensional, planar or non-planar array of antennas, for which the repeating ground tracking pattern of the satellite constellation is known, gain enhancement is added to the system in a direction substantially normal to the direction of the repeating ground tracking pattern In a further aspect, a method of uni-dimensionally steering in a coordinate system a phased array antenna system configured for communication with a satellite constellation that emits or receives radio frequency (RF) signals and has a repeating ground track in a first direction includes identifying a repeating ground track of the satellite constellation in a first direction, orienting a phased array antenna in the first direction, enhancing gain in the second direction of radio frequency signals received by and emitted from the phased array antenna, and receiving and/or emitting RF signals between the satellite constellation and the antenna. The antenna includes a plurality of antenna elements distributed in a plurality of M columns oriented in the first direction and a plurality of N rows extending in a second direction normal to the first direction, and a plurality of phase shifters aligned for phase offsets between antenna elements in the first direction. The coordinate system may be spherical or Cartesian.

Antenna lens 16 can be disposed between the phased array antenna 14 and the satellite to increase gain. In one embodiment of the present disclosure, the lens is configured for concentrating, dispersing, or otherwise modifying the direction of movement of light, sound, electrons, etc. To achieve such effect, the antenna lens may be curved. The antenna lens can be made of, for example, glass, polymers, epoxies, or other materials that transmit RF radiation. In one embodiment, the antenna lens has a focusing direction oriented generally perpendicular to the direction of the trajectory of the satellite and focuses the RF signal (e.g., the main lobe of the RF signal) onto several arrays of the individual antenna elements.

As a result of the antenna lens 16, the RF signal intensity or the signal-to-noise ratio (SNR) increases for the antenna elements. As the signal intensity or SNR is increased, the number of columns M of antenna elements may be reduced (as compared to the number of rows N) while still maintaining acceptable signal strength.

Expandable or Inflatable Mobile Antenna

Figure 2F:
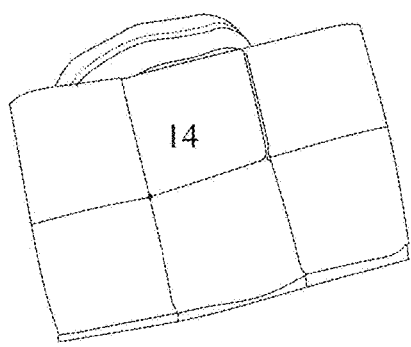

Next an expandable or inflatable mobile antenna is detailed providing for expansion in antenna area as needed and compaction when not used. While the embodiments of FIGS. 2E-2F are shown as backpack antennas, expandable antennas can be used in a variety of mobile platforms. For example, the expandable antenna can be mixed with the rack mount to provide an inflatable rack mount antenna that deploys as needed and retracts out of the way when not used.

FIG. 2F shows an expandable embodiment of FIG. 2D. In this embodiment, the antenna is foldable during non-use, and inflates to full size for increased signal reception. This embodiment provides more room for antenna size or solar size, or both. The inflatable membrane can be compressed and compacted and subsequently inflated one or more times without substantially altering the original inflated shape of the membrane or the reflective efficiency of the first RF reflective portion and the second RF reflective portion. During inflation, a pump injects air into the inflatable antenna structure to fully inflate the antenna. The pump can be electrical or mechanical pump, or a user can blow into an air valve to manually inflate the antenna. Alternatively, the motor to move the antenna 14 can be converted into an air compressor to pump air into the antenna.

In a Gregorian embodiment, the inflatable structure includes an inflatable membrane for forming the structure, a first RF reflective portion 15 integral to the inflatable membrane, and a second RF reflective portion integral to the inflatable membrane. When the membrane is inflated, the first RF reflective portion and the second RF reflective portion oppose each other to form an antenna. In some embodiments, the inflatable membrane is made or assembled to be in one piece. In some embodiments, the first RF reflective portion comprises a main reflector and the second RF reflective portion comprises a subreflector, and the main reflector includes a first concave surface and the subreflector includes a second concave surface. The first concave surface and the second concave surface are spaced from and oppose each other to form a Gregorian antenna. In other embodiments, the first RF reflective portion comprises a main reflector and the second RF reflective portion comprises a subreflector, and the main reflector includes a concave surface and the subreflector includes a convex surface. The concave surface and the convex surface are spaced from and oppose each other to form a Cassegrain antenna.

Figure 2G:
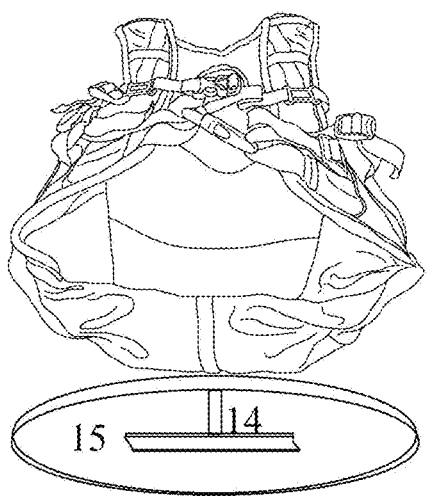

In accordance with another embodiment shown in FIG. 2G, an inflatable antenna may include an inflatable dish including a radio frequency (RF) reflective main reflector and an opposing RF transparent dish wall. An RF transparent support member extends from the RF transparent dish wall away from the main reflector and has a free end. An RF reflective subreflector is proximate and attached to the free end of the RF transparent support member, and the support member and the subreflector are inflatable. When the antenna is inflated, the main reflector and the subreflector oppose each other to reflect RF energy toward each other to form an antenna. In some embodiments, the main reflector and the RF transparent dish wall define a dish interior volume, the subreflector and the RF transparent support member define a support member interior volume, and the dish interior volume and the support member interior volume are in fluid communication.

The antenna may be made of any flexible material for forming a membrane that will contain a gas and includes, but is not limited to, such materials, for example, as Mylar, fiber reinforced material with a weave, thin film doped or vapor deposited, or aluminized rubber fabric. In addition, the material will preferably (a) hold its shape after being folded, rolled, compressed, or compacted, (b) be capable of being coated with a smooth, highly RF reflective substance to make it suitable as an antenna, (c) be RF transparent when without RF reflective coating, and (d) when RF reflective coating is applied, be capable of being compressed and compacted and subsequently being uncompressed and uncompacted one or more times without affecting its original and desired inflated shape or ability to efficiently reflect RF energy.

In another aspect, a global communication backpack includes: a backpack portion; at least one inflatable antenna attached to the backpack portion; an actuator to move the antenna to face a satellite; transceivers to communicate with the satellite; and a processor controlling the actuator to optimize communication.

One embodiment uses reflectors as an EM gain enhancement system to focus the RF signals onto the antenna elements of the phased array antenna 14. For example, the reflectors may receive the incoming RF signals through the antenna lens 16, and then reflect the incoming RF signal to the antenna elements. The received RF signals may be routed to individual LNAs, and further to other elements of the RF receiver.

Suitable reflectors may include mirrors or other reflective surfaces. The reflectors may be made of metals (e.g., copper, aluminum, steel, etc.) that do not significantly transmit/absorb the RF signal at the frequency of interest (e.g., V-band, Ka-band, etc.). The gain enhancement system includes an optional lens for enhancing gain together with the reflector 15. However, the gain enhancement system of the illustrated embodiment may operate for suitable gain enhancement with or without the optional lens. The antenna lens includes multiple layers. For example, individual layers may be made of materials that have different refraction coefficient. In some embodiments, the individual layers may be made from different polymers that may be adhered or fused together. The individual layers may be selected and combined to improve focusing of the RF signal 350 at different frequencies, for example, in V-band or Ka-band. In other embodiments, the antenna lens may be oriented in a flat configuration or another curved configuration besides a semi-cylindrically shaped configuration.

In another embodiment, the phased array antenna 14 can include several separate phased array antennas 14' each including antenna elements M×N. Multiple phased array antennas can be arranged circumferentially, separated by separating elements, such as reflectors 15. In some embodiments, an optional antenna lens or reflector focuses the RF signal onto the antenna elements M×N of the phased array antennas. Reflectors can also focus the RF signal to the antenna elements M×N of phased array antennas by reflecting the RF signal.

In some embodiments, depending on the location of the satellite and the orientation of the antenna elements, the phased array antennas 14 may be differently exposed to the incoming RF signal. For example, the antenna elements that are oriented circumferentially to face the satellite at given time may receive stronger RF signal, while those antenna elements that face away or sideways from the satellite may receive weaker RF signal. In some embodiments, a controller C may turn off those antenna elements that receive a weak RF signal to, for example, reduce energy consumption, improve system reliability, or to focus the selected antenna elements for the RF signal coming from a different satellite.

A superstrate grating can be used that provides gain enhancement by creating a resonance cavity between a free-standing metal strip and an electric Hertzian dipole on the grounded dielectric slab substrate. Therefore, the resonance cavity provides multiple reflections between the ground plane and the superstrate with a reduce area for the wave to leak out. Other gratings can be used, including grating patterns having switches for opening and closing the grating depending on the direction of communication.

In one aspect, a mobile phased array antenna system mounted on a mobile platform and configured for communication with a satellite that emits or receives radio frequency (RF) signals and has a repeating ground track in a first direction, the antenna system including: a phased array antenna mounted on the mobile platform including a plurality of antenna elements distributed in a plurality of M columns oriented in the first direction and a plurality of N rows extending in a second direction normal to the first direction, and a plurality of fixed phase shifters aligned for phase offsets between antenna elements in the first direction; and a gain-enhancement system configured for gain enhancement in the second direction of radio frequency signals received by and emitted from the phased array antenna; a controller configured to turn individual antenna elements on and off based at least in part on orientations of the individual antenna elements relative to the satellite, wherein an orientation of an individual antenna element relative to the satellite is correlated with a strength of RF signals received by the individual antenna element from the satellite; and code to compensate for movements away from the second direction and to guide the mobile platform toward the second direction. In one embodiment, the code visually or audibly guides the user to move to or align with an optimal antenna second direction. Pseudo-code can include:

identifying a repeating ground track of the satellite constellation in a first direction;
orienting a phased array antenna in the first direction, the antenna including a plurality of antenna elements distributed in a plurality of M columns oriented in the first direction and a plurality of N rows extending in a second direction normal to the first direction, and a plurality of phase shifters aligned for phase offsets between antenna elements in the first direction;
enhancing gain in the second direction of radio frequency signals received by and emitted from the phased array antenna;
receiving and/or emitting RF signals between the satellite constellation and the antenna; and switching individual antenna elements on and off by a controller based at least in part on orientations of the individual antenna elements relative to satellites of the satellite constellation, wherein an orientation of an individual antenna element relative to a satellite of the satellite constellation is correlated with a strength of RF signals received by the individual antenna element from the satellite of the satellite constellation; and
compensating for movements away from the second direction and guide a mobile platform toward the second direction normal to the first direction to optimize satellite communication.

In accordance with one embodiment of the present disclosure, a phased array antenna system configured for communication with a satellite that emits or receives radio frequency (RF) signals and has a repeating ground track in a first direction is provided. The antenna system includes: a phased array antenna including a plurality of antenna elements distributed in a plurality of M columns oriented in the first direction and a plurality of N rows extending in a second direction normal to the first direction, and a plurality of fixed phase shifters aligned for phase offsets between antenna elements in the first direction; and a gain-enhancement system configured for gain enhancement in the second direction of radio frequency signals received by and emitted from the phased array antenna.

Various modifications may be made without deviating from the disclosure. For example, in some embodiments, curved mirrors can be used to focus RF signal onto the antenna elements. In some embodiments, the focal point (or area) of the curved reflector correspond to the location of the antenna elements. In some embodiments, the antenna lens/reflector/mirror can be optimized for particular frequency or angle of attack (AoA) of the RF signal from the satellite.

While the EM gain devices or reflectors/lens/focusing devices are shown with the backpack, they can be applied to any of the mobile platforms mentioned below for wearables, watches, clothing, trucks, cars, planes, drones, etc.

Rack Mounted Antenna

Figure 3A:
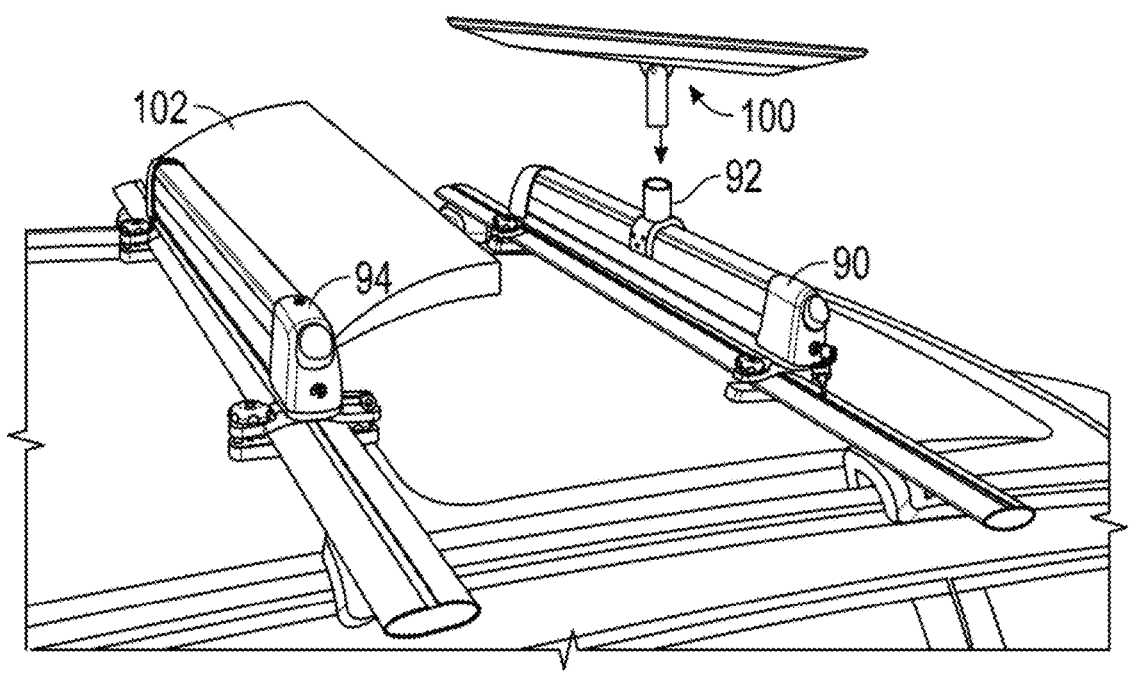
FIGS. 3A-3C show an exemplary global comm system on a vehicle with rack mounted antenna.
Figure 3B:
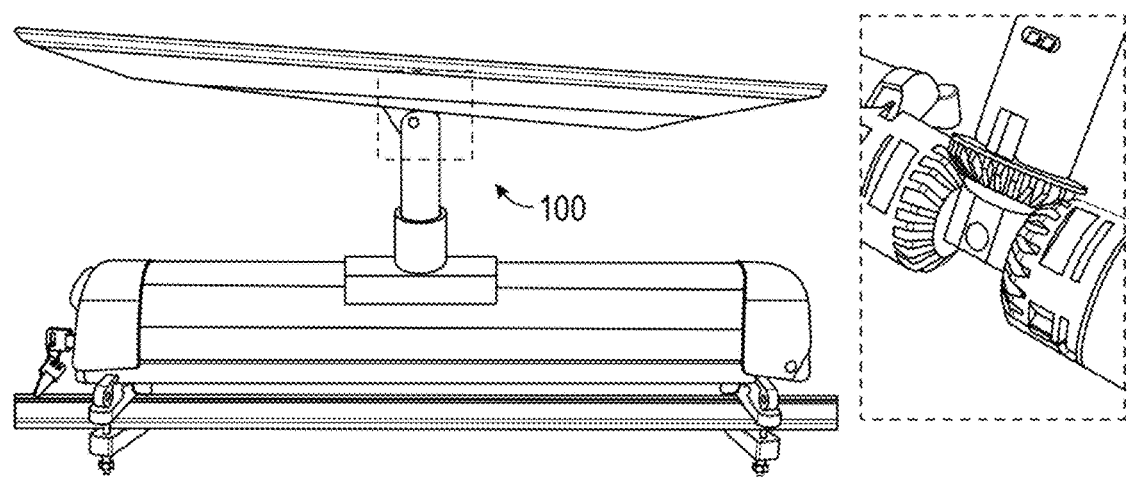
Figure 3C:
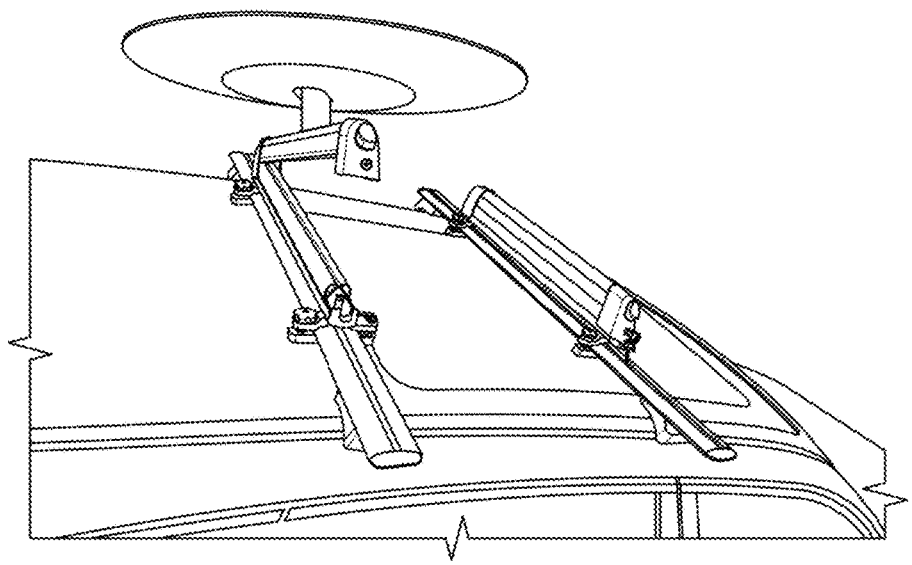

In another aspect, the satellite antenna can be mounted to cars/trucks, recreational vehicles (RVs), boats, personal drones, and planes, among others. FIGS. 3A-3C show exemplary rack-mounted antenna systems for communication with satellites. Preferably, as shown in FIG. 3A-3B, the system includes at least one rack carrier 90 with an antenna mount receptacle 92 that secures a moveable antenna 100. In one embodiment, the antenna 100 moves on one axis to establish linkage with the satellites. In other embodiments, the antenna 100 can move on multiple axes to focus on selected satellites.

While only one rack may be needed to mount the antenna 100 to a vehicle, for high-speed travel, a windshield can 102 can be mounted on a second rack carrier 94. The windshield 102 can be motorized and can be actuated to move up to direct air to flow with low resistance around the antenna 100 and also to push the vehicle to the ground at high speed.

As shown in the embodiment of FIG. 3C, the rack carrier can be opened and closed to clamp pairs of skis or snowboards. The rack carriers come with locks and big open buttons, and a lock with a key can be used to prevent theft of the antenna 100 or skis/snowboards. Securing the rack carriers to the racks can be done with clamps and bolts and the mounts enable quick setup and removal. In the embodiments of FIG. 3A-3C, the antenna and its housing are mounted above a vehicle such as aftermarket and original equipment manufacturers (OEM) to allow for satellite TV and data service. The housing for the antenna system protects a plurality of antenna elements defining an antenna aperture with: a chassis portion; and a radome portion configured for coupling to the chassis portion to define an inner chassis chamber, the radome portion having a planar top surface, wherein the radome portion is configured to have equal spacing between the planar top surface and a top surface of each of the plurality of antenna elements defining the antenna aperture. The housing may include other electronic components, including by not limited to a modem, a Wi-Fi card and Wi-Fi antennas, a GPS antenna, etc. The radome portion includes a first layer and a second layer, wherein the first layer is a protective layer made from a fiberglass-reinforced epoxy laminate material. The second layer is a spacing layer made from a polymethacrylimide foam. The chassis portion has an internal support portion for internal components for the plurality of antenna elements including a bonding portion for bonding an internal carrier to the chassis portion; and a radome portion configured for coupling to the chassis portion to define an inner chassis chamber. The bonding portion includes a plurality of bonding bars oriented in a parallel configuration.

Another embodiment facilitates a rooftop tent or a storage area for holding skis or luggage below the antenna. Additionally, a custom soft box may be utilized for storage, and easily removed when not in use. Alternatively, an antenna may be packaged on top of a roof box carrier to allow constant TV reception and storage below in the box.

In one aspect, a system includes an antenna carrier adapted to be removably attached to a vehicle rack and having an antenna receptacle, and a satellite dish mounted in the antenna receptacle to provide internet access through one or more satellites. The carrier can be secured to a vehicle rack. The rack can in turn secure skis/snowboards, or can secure a cargo container in parallel with the antenna(s). The vehicle can be a car, truck, RV, train, boat, submarine with a float-mounted antenna, drone, or plane, for example. Bluetooth or Wi-Fi transceivers communicate data to/from transceivers connected to the antenna to provide wireless data access. The antenna power up, motion compensation, and signal lock operation are similar to those operations described above.

The wireless satellite communication device may be located on or within the mobile platform or both. In one embodiment, the wireless satellite communication device is located within the passenger compartment of a vehicle, for example, under a seat or within the trunk of a car. The wireless satellite communication device may partially be placed on the exterior of the vehicle with a portion on the interior; for example, the satellite antennas may be placed on the exterior of an airplane while the local antenna may be placed within the airplane. The wireless satellite communication device may be attached to the top, front, sides or rear of the vehicle. The wireless satellite communication device may placed on or near a window. For example, the wireless satellite communication device may be placed on the roof of a car near the back window. The local antenna may then be placed on the near the window for better communication within the vehicle. In another embodiment of the invention, the satellite antenna may be placed on the exterior of the vehicle, and the local antenna may be placed within the vehicle. The satellite antennas may be in communication with the local antenna with a communication cable. The communication cable may follow the power cable to the satellite antennas or may communicate through the power cable. The satellite antennas may communicate with the local antenna within the vehicle, using Ethernet standards, USB, IRBA, DSL, EIA, or other communications standards. Data processing may occur with the satellite antennas which may prepare the data for transmission at the local antenna. There are many other combinations that will be apparent to those skilled in the art upon reading this disclosure. A number of variations and modifications of the disclosed embodiments can also be used. For example, the vehicle described in embodiments of the invention, may be a backpack, a tent, a heat car, train, boat, truck, bus, or airplane. Applications may extend to commercial, military or consumer applications.

Roof Cavity/Recess Mounted Antenna

Figure 3D:
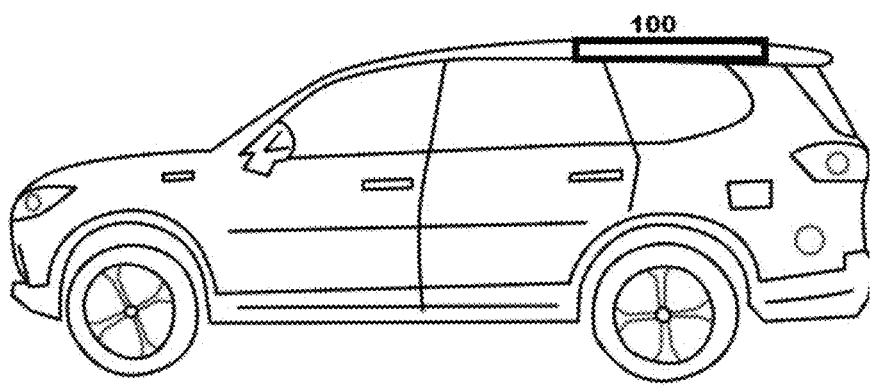
FIG. 3D shows the satellite antenna embedded in a vehicle ceiling or roof.

FIG. 3D shows one embodiment where the antenna 100 is in a roof recess and has sufficient room to rotate for satellite alignment. Preferably, the roof section above the antenna 100 is electromagnetically transparent to enable RF signals to reach the antenna with minimal loss. In another embodiment, the roof recess is open-ended to allow direct antenna exposure to free air. To protect against rainwater collecting in the cavity, the roof recess is slightly angled to enable water drainage away from the cavity or recess. In this embodiment, the antenna rotates inside of the cavity enclosed in the vehicle roof. In another embodiment, to improve signal reception, the roof module's antenna is actuated by a motorized lift to extend the antenna above the top. When not in use, the antenna may retract to maintain a standard roofline. Alternatively, instead of motor actuation, the antenna can be extended manually, by a hand-cranked, or by a spring lift to raise the antenna off of the roof.

FIG. 3D shows an SUV automobile with a wireless satellite communication device including a satellite antenna 100 coupled with the exterior of the automobile, a local antenna (not shown) coupled with the interior of the vehicle to transmit Wi-Fi/Bluetooth/Zigbee signals, and an optional solar panel (not shown) according to one embodiment of the invention. The local antenna relays internet signals from the wireless satellite communication device and broadcasts Wi-Fi/Bluetooth signals into the interior of the automobile. In such an embodiment, the wireless satellite communication device may provide at least wireless connectivity for wireless devices within the automobile with the local antenna. The wireless satellite communication device may be coupled with circuitry including signal processing, logic, memory, etc. located within the trunk of the automobile. This circuitry may be placed anywhere within or without the vehicle. The wireless satellite communication device, in this embodiment of the invention, is powered using the automobile's power supply or an optional solar panel. The local antenna is secured within the interior of the automobile and a wire couples the local antenna with circuitry.

In providing optional solar power, the wireless satellite communication device is powered independent from the automobile power supply. The circuitry or wireless satellite communication device may include a battery. The battery may be rechargeable. Accordingly, the wireless satellite communication device may be mobile, providing wireless access to a network as long as sufficient solar energy is incident on the solar panel. The wireless satellite communication device may also include a battery that stores electrical energy received from the solar panel. The battery may then be used to power the wireless satellite communication device. According to this embodiment of the invention, the wireless satellite communication device is powered independent of the vehicle power supply. As such, a user may remove the wireless satellite communication device from the vehicle. The wireless satellite communication device may be used independently from the vehicle. The local antenna may have a gain pattern designed to provide increased gain to the vehicle interior and to minimize gain outside the vehicle. For example, the local antenna may include a patch antenna affixed with the rear window of the vehicle (or other location). The gain of the patch antenna may provide increased gain to the interior of the vehicle and decreased gain to the exterior of the vehicle. The gain pattern may vary from vehicle to vehicle. The gain pattern may be quickly adjusted when the wireless device is used on a new and/or different vehicle. The local antenna according to embodiments of the invention may also include a dipole antenna, an adaptive array antenna, a plurality of antennas, adaptive array antenna(s), a switched beam antenna, a phased array, a microstrip antenna, etc.

In one aspect, a system includes an angled recess on a vehicle roof, a water drainage port on a low side of the recess to prevent liquid build-up in the recess, and a satellite dish mounted in the recess to provide internet access through one or more satellites. The vehicle can be a car, truck, RV, train, boat, submarine with a float-mounted antenna, drone, or plane, for example.

Transparent Antenna as Window or Sunroof

Figure 3E:
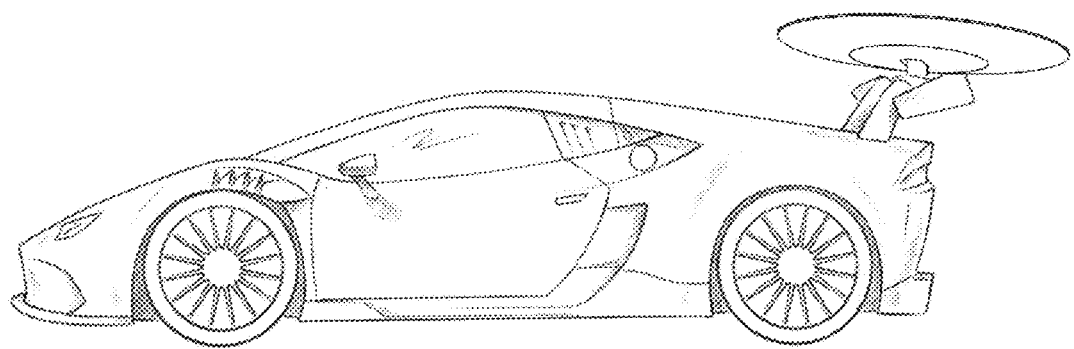
FIG. 3E shows a car mounted antenna.
Figure 3F:
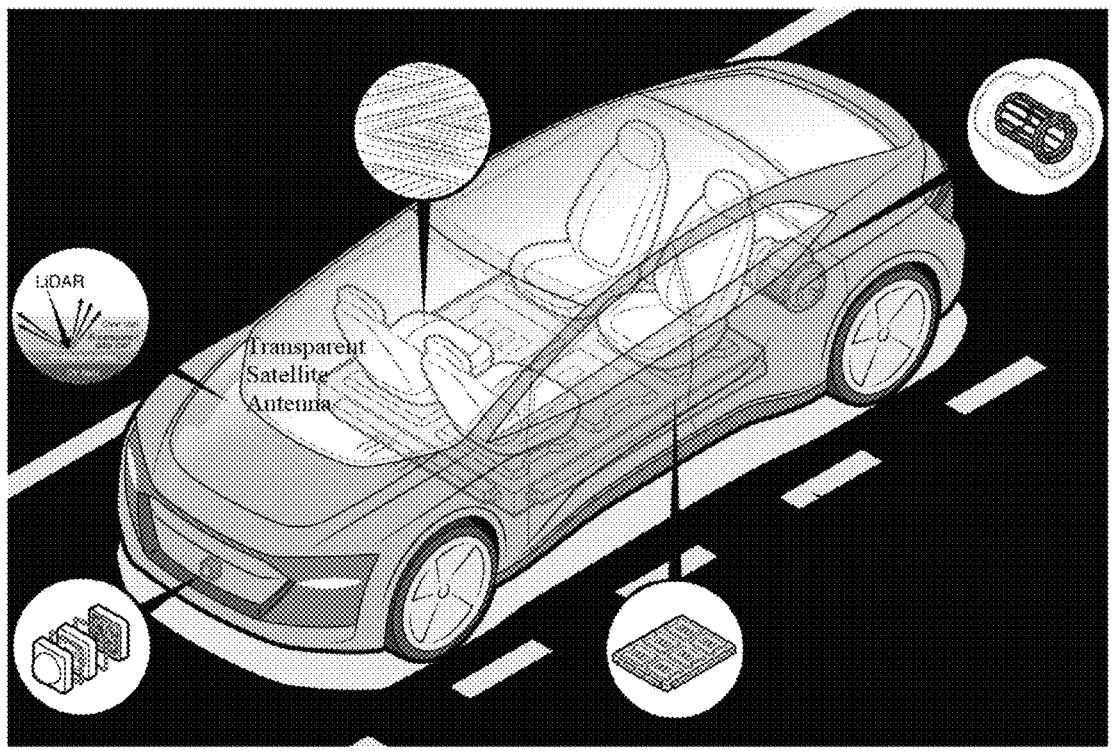
FIG. 3F shows a transparent satellite antenna for an autonomous vehicle.

FIG. 3F shows a smart car with clear 360-deg views of the environment for occupant viewing pleasure. While the antenna can be mounted in the trunk or around the canopy of the car, it is preferred that the antenna be clear to be used over the top of the car. In embodiments, the antenna is made of transparent conductors deposited on clear substrate and the entire assembly is used as an infinity ceiling window for the vehicle, allowing light into the vehicle compartment and providing data communication capability at the same time. The antenna comprises at least a glass, plastic, or other material known in the art. For example, the antenna may include toughened glass between 4 and 6 mm thick with varying degrees of light transmission and solar energy absorption.

The smart car of FIG. 3F may include a transparent antenna system, a satellite transceiver, a WiFi/Bluetooth transceiver, and a processor. The smart car may further include a display, keypad, speaker, memory, microphone, and/or camera. A transmitter portion of transceiver converts information into electromagnetic signals suitable for satellite communications and a receiver portion of the transceiver demodulates electromagnetic signals, which are received from the satellite. Accordingly, when the transparent antenna system includes two active antenna arrays to receive from multiple satellites, the transceiver may include two transmit/receive circuits connected to different ones of the antenna elements via the respective RF feeds.

In one embodiment the antenna is a transparent phased array antenna system mounted on top of a mobile platform and configured for communication with a satellite that emits or receives radio frequency (RF) signals and has a repeating ground track in a first direction, the antenna system including: a phased array antenna formed on glass or clear plastic which is then mounted on a mobile platform such as a car/drone, the antenna including a plurality of antenna elements distributed in a plurality of M columns oriented in the first direction and a plurality of N rows extending in a second direction normal to the first direction, and a plurality of fixed phase shifters aligned for phase offsets between antenna elements in the first direction.

In one embodiment, the transparent antenna 14 is on as the transparent plastic sheet of the transparent base with electrical insulating property, to form the M×N antenna pattern. In addition to the transparent plastic sheet the system can use the clear glass of sheet though can use transparent resin films such as Merlon, acrylic acid, PET, triacetic acid aldehyde cellulose. One transparent phase array antenna that is optically transparent uses a single dielectric layer that is optically transparent and having an optically transparent ground plane and adhesive layer on one side and optically transparent radiating elements formed as patch antenna elements on the opposite side of the single dielectric layer. A beam former network formed of signal tracks is connected to the patch antenna elements and is optically transparent. The signal tracks can be formed by conductive patterns applied directly to the dielectric with optically transparent conductive materials discussed below. The patch antenna elements are also be formed from the optically transparent material.

One exemplary substantially planar configured phase array antenna has two dielectric layers where a first dielectric layer has opposing sides and is formed of a material that is optically transparent. An optically transparent conducting layer is positioned on top of the first dielectric layer and includes radiating slots. A second dielectric layer is also formed from a material that is optically transparent and includes a beam forming network formed as microstrip signal tracks that are adhered to the second dielectric layer. A ground plane is positioned on the opposing side of the second dielectric layer and is also optically transparent. An optically transparent adhesive layer is secured on the ground plane and allows the phase array antenna to be applied onto a top of a vehicle roof, a side of a building or window pane. The antenna substrate can be moved by one or more actuators as discussed above to allow some angular adjustment in that planar orientation.

Different optically transparent materials can be used for the dielectric layers including fluoropolymers or ferroelectrics that exhibit dielectric properties and possess these dielectric properties known to those skilled in the art and are suitable for radio frequency circuit designs. Other materials that could possibly be used include various clear materials as known to those skilled in the art, such as glass, polyester, ceramics, quartz, plastics, resin-based materials, or other known materials. The conductive signal tracks that form the beam forming network and formed as microwave signal tracks can be applied directly to the dielectric by an optically transparent material as detailed below. The optically transparent conducting layer can also be formed from such materials. These optically transparent conductors could also be used to form electrical connections (vias) between different conductor layers within the array. The radiating slots are formed in predetermined rows, and the signal tracks, which can be formed as strip lines, extend under respective predetermined rows. A dielectric layer, including air, can be interposed between the slots and beam forming network. Other dielectric materials could be used as known to those skilled in the art. Each row can have a predetermined slot spacing and can be dimensioned for receiving a predetermined sensed operating frequency of a received signal.

One embodiment uses indium tin oxide (ITO) for transparent conductors. Alternatively, Poly(3,4-ethylenedioxythiophene) (PEDOT) can also be used. However, either PEDOT or ITO is expensive and has a complicated manufacturing process. Carbon nanotubes or nanostructured transparent conductive films can be used instead. Conducting nanowire networks and metal mesh can also be used as flexible transparent antenna electrodes. Other transparent materials include:

| Material | Sheet Resistance ($\Omega/\square$) | Visible Absorption Coefficient $\alpha$ | Figure of Merit ($\Omega^{-1}$) |
|---|---|---|---|
| ZnO:F | 5 | 0.03 | 7 |
| $Cd_2SnO_4$ | 7.2 | 0.02 | 7 |
| ZnO:Al | 3.8 | 0.05 | 5 |
| $In_2O_3$:Sn | 6 | 0.04 | 4 |
| $SnO_2$:F | 8 | 0.04 | 3 |
| ZnO:Ga | 3 | 0.12 | 3 |
| ZnO:B | 8 | 0.06 | 2 |
| $SnO_2$:Sb | 20 | 0.12 | 0.4 |
| ZnO:In | 20 | 0.20 | 0.2 |

| Property | Material |
|---|---|
| Highest transparency | ZnO:F, $Cd_2SnO_4$ |
| Highest conductivity | $In_2O_3$:Sn |
| Lowest plasma frequency | $SnO_2$:F, ZnO:F |
| Highest plasma frequency | Ag, TiN, $In_2O_3$:Sn |
| Highest work function, best contact to p-Si | $SnO_2$:F, $ZnSnO_3$ |
| Lowest work function, best contact to n-Si | ZnO:F |
| Best thermal stability | $SnO_2$:F, TiN, $Cd_2SnO_4$ |
| Best mechanical durability | TiN, $SnO_2$:F |
| Best chemical durability | $SnO_2$:F |
| Easiest to etch | ZnO:F, TiN |
| Best resistance to H plasmas | ZnO:F |
| Lowest deposition temperature | $In_2O_3$:Sn, ZnO:B, Ag |
| Least toxic | ZnO:F, $SnO_2$:F |
| Lowest cost | $SnO_2$:F |

The antenna can be made from a conductive paste film, the carbon paste agent film that are perhaps contained these metal particles by the metal film that contains copper, nickel, aluminium, gold, silver etc. Through the metallic film that is formed on the transparent plastic sheet can be done using photoetching. Upon the etching of printing resist, the conductive resin paste can form a fine mesh-shape figure. On metal film, the antenna pattern can be printed with the resist film with methods such as silk screen printing, intaglio printing, ink-jets; After etching, the system can remove resist film through peeling off, and form the antenna pattern of metal film the resist covering of metal film. In addition, when utilizing the conductive paste printing to form, with printed antenna figure on transparent base such as the conductive paste that comprises metal particle, carbon paste agent, thus the antenna pattern of formation conductivity.

The large surface on top of a plane or a car enables more antenna elements to be formed on the transparent substrate. The number of elements required in a phased array antenna can be estimated by the gain it must provide, as more antenna elements yields more gain in a phased array antenna. The antenna elements have uniform spacing between antenna elements (e.g., spacing or distance) for high gain. The larger the area of the antenna aperture, the narrower the beam produced from the antenna aperture. In an antenna aperture having an antenna lattice with a plurality of antenna elements, gaps between adjacent antenna elements can produce unwanted side lobes. Therefore, a threshold maximum spacing is provided between antenna elements to reduce unwanted side lobes. The individual antenna elements are spaced in the antenna aperture below the threshold maximum spacing to reduce side lobe leakage. In addition to unwanted side lobes, grating lobes can occur when steering too far with a phased array. The effect of grating lobes is also referred to as "aliasing," resulting in the main beam reappearing on the wrong side. Therefore, antenna elements must also be spaced properly in order to avoid grating lobes. For uniformly spaced arrays with a constant spacing between elements, the maximum spacing can be half-wavelength to avoid grating lobes.

In one embodiment, the system communicates with satellites that are visible on the horizon above a minimum elevation angle of 25 degrees. The phased array user terminal tracks non-geostationary orbit satellites passing within its field of view. As the terminal steers the transmitting beam, it automatically changes the power to maintain a constant level at the receiving antenna of its target satellite, compensating for variations in antenna gain and path loss associated with the steering angle. The system works with a wireless communications system, a wideband communications system, a satellite-based communications system, a terrestrial- or ground-based communications system, a non-geostationary (NGO) satellite communications system, a low Earth orbit (LEO) satellite communications system, and/or the like. For example, without limitation, the phased array antenna system can be included in a satellite, a user terminal associated with user device(s), a gateway, a repeater, a communication node, and/or other device capable of receiving and transmitting signals with another device of a satellite communications system.

The antenna can be part of a sunroof. The mechanism for opening and closing the "sunroof" antenna may allow retraction via a related art sun roof mechanism and installation (for example, linear or stepper motor drive tract). As an alternative embodiment, the antenna may be incorporated into a related art sunroof package, thus having both the conventional sunroof, and the antenna disposed above or below the sunroof.

Antenna on Air Vehicles

Figure 3G:
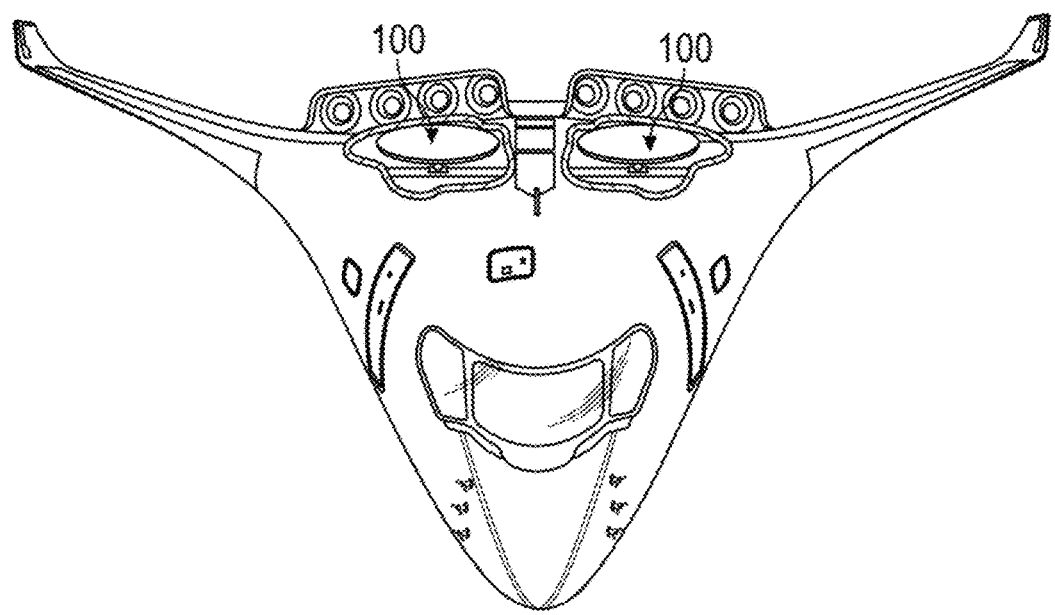
FIG. 3G shows an exemplary drone or aircraft satellite antenna.

FIG. 3G shows an exemplary plane with a plurality of movable satellite antennas mounted just below the top or ceiling of the aircraft. The antenna can be recessed in the upper wing/body of the plane with water drainage if exposed to the environment. Alternatively the antenna can have a radome with hydrophobic material and heater to melt snow/ice, for example. The top cover provides structural support while enabling RF signals to pass with minimal signal loss (RF transparent). The plane of FIG. 1E uses a blended-wing body in which the wings merge with the main body of the aircraft with a range similar to that of a turbofan plane where the antennas are positioned on top of the plane. The wide fuselage opens up multiple options for an antenna array or for other needs such as hydrogen storage and distribution, and for cabin layout. In the blended-wing body configuration, two hybrid hydrogen turbofan engines provide thrust. The plane of FIG. 3E is zero-emission in term of carbon output.

In one embodiment, a multi-antenna satellite system provides internet access to passengers in communication with two satellites according to one embodiment of the invention. The wireless satellite communication device may also be in communication with any combination of repeaters, satellites and/or terrestrial antennas, and/or one or more terrestrial repeaters or any combination thereof.

The system can provide continuous adaptive aggregation of broadband communications channels. Each satellite provides broadband communication channel links are established with the passengers. First a main bonding group is formed with a predetermined number of channels to serve regular passengers, and a priority service channel (extra cost) is formed with a second predetermined channels to serve premium customers. A user may request priority service for always on access at additional cost. Next, channels are bonded together to form a bonding group and the threshold parameters of the group are set. The "threshold parameters" guide the addition or removal of channels from the bonding group. The parameters may be set based on usage cost, bandwidth limits, etc. In the present embodiment, the key goal of setting threshold parameters is ensuring that priority passengers have a constant adequate level of service. For example, a threshold parameter may be set so that when priority passengers are using 90% of the throughput capacity of their dedicated channels, another channel is removed from the main bonding group and dedicated for premium customer use. When all channels are used, links to a second satellite are added and the process repeats to provide adequate service to all passengers who desire broadband access in the plane.

In one aspect, an air vehicle includes a wing body frame with a delta shaped cabin extending into a contiguous wing on both sides of the cabin, engines mounted on the wing body frame, and one or more satellite antennas positioned on the wing body frame facing one or more satellites to provide communication. In one embodiment, the plane runs on hydrogen fuel, and liquid hydrogen storage tanks are stored underneath the wings, while the satellite antennas are on top of the wings or the aircraft body. The air vehicle can carry passengers or transport large structures such as vehicles or inventory, among others. The antenna can be a phased array antenna system mounted on the air vehicle and configured for communication with a satellite that emits or receives radio frequency (RF) signals and has a repeating ground track in a first direction, the antenna system including: a phased array antenna mounted on the mobile platform including a plurality of antenna elements distributed in a plurality of M columns oriented in the first direction and a plurality of N rows extending in a second direction normal to the first direction, and a plurality of fixed phase shifters aligned for phase offsets between antenna elements in the first direction.

In another aspect, a drone or a passenger air vehicle includes a wing body frame, and one or more LEO satellite antennas positioned on the wing body frame facing one or more satellites to provide communication. In yet another aspect, a drone includes a wing body frame, and one or more satellite antennas positioned on the wing body frame facing one or more satellites to provide communication, wherein the antenna is a mobile phased array antenna system mounted on the drone or suitable mobile platform and configured for communication with a satellite that emits or receives radio frequency (RF) signals and has a repeating ground track in a first direction, the antenna system including: a phased array antenna mounted on the mobile platform including a plurality of antenna elements distributed in a plurality of M columns oriented in the first direction and a plurality of N rows extending in a second direction normal to the first direction, and a plurality of fixed phase shifters aligned for phase offsets between antenna elements in the first direction.

For both drone/air vehicle aspects, implementations may include one or more of the following. In one embodiment, the plane runs on hydrogen fuel, and liquid hydrogen storage tanks are stored underneath the wings, while the satellite antennas are on top of the wings or the aircraft body. In another embodiment, the drone is an ICE gasoline engine. In yet another embodiment, the solar panels and antenna(s) are placed on top of the drone to provide power and command/control of the drone at long distances. In other implementations, the system may include one or more of: a gain-enhancement system configured for gain enhancement in the second direction of radio frequency signals received by and emitted from the phased array antenna; a controller configured to turn individual antenna elements on and off based at least in part on orientations of the individual antenna elements relative to the satellite, wherein an orientation of an individual antenna element relative to the satellite is correlated with a strength of RF signals received by the individual antenna element from the satellite.

Drivable Tent with Antenna Mount

Figure 4A:
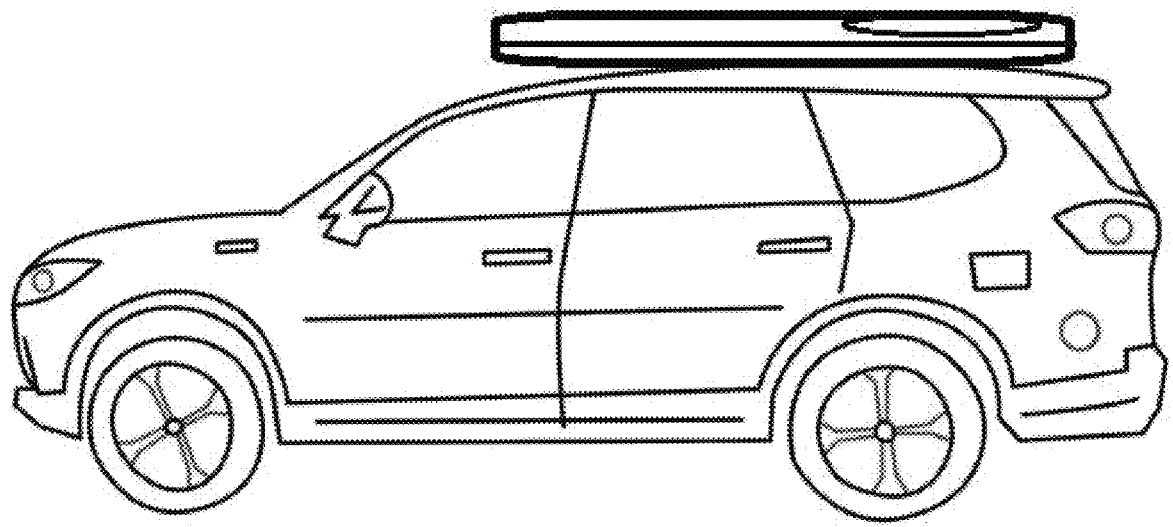
FIGS. 4A-4C show exemplary car tent satellite antenna mountings.
Figure 4A:
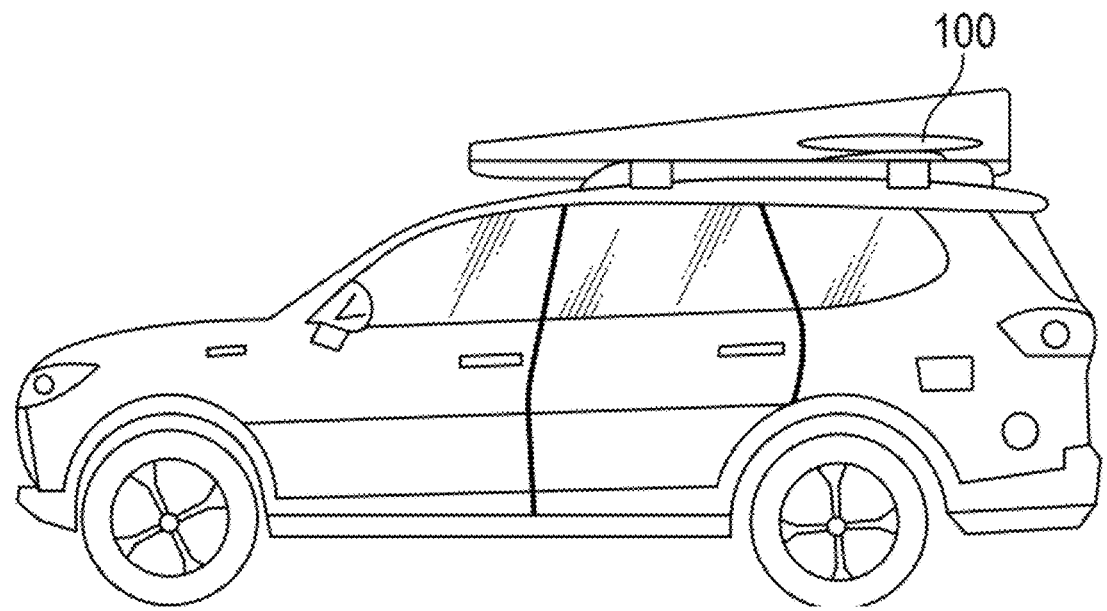
Figure 4B:
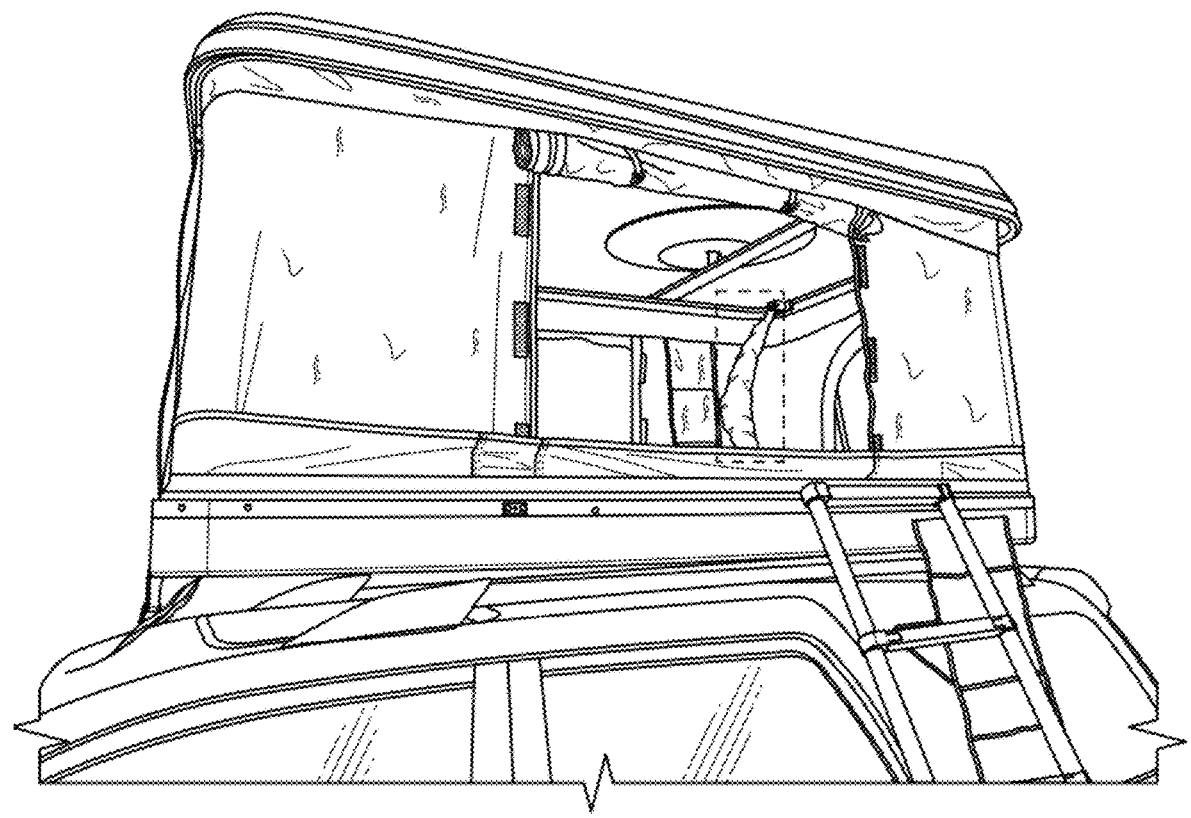
Figure 4C:
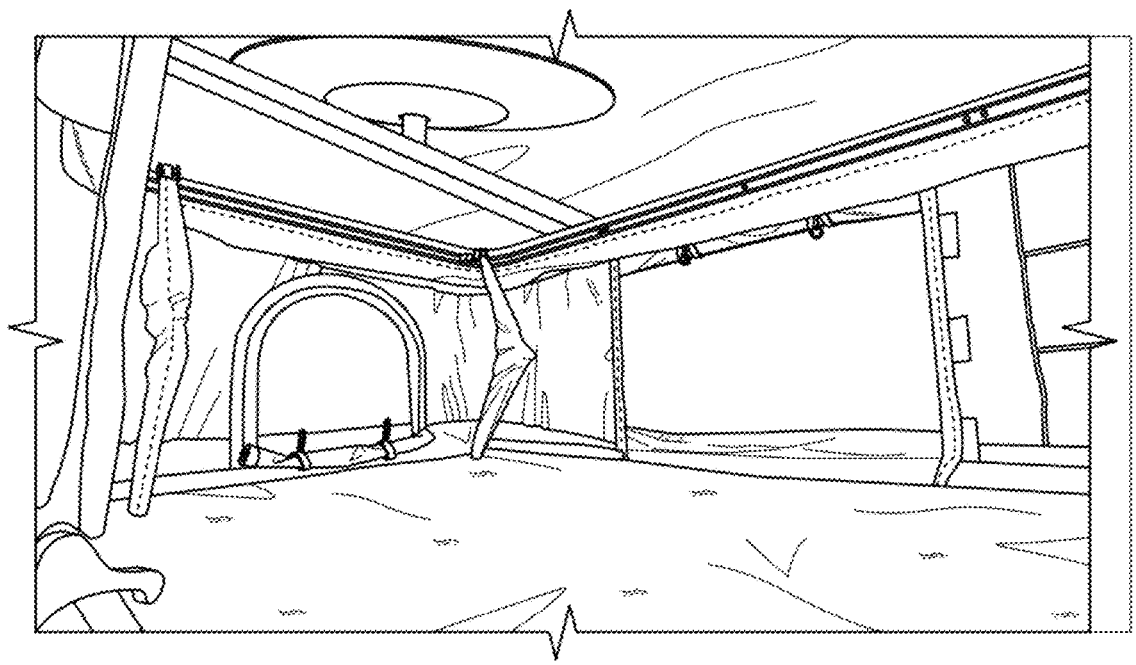

FIG. 4A-4C show an exemplary rooftop tent with an antenna built-in. The rooftop tent is secured to racks on the vehicle. It has a top portion and a bottom cover portion hingeably connected by four hydraulic arms, springs, hinges at each corresponding corner of the top/bottom portions. When deployed, a simple push causes the hydraulic arms, springs or hinges to pop out the top cover portion. The tent is made of a durable ABS hard plastic shell that provides protection and security. The antenna 100 is mounted inside the tent on a bar across the top cover portion. When done, the user pulls the cables on the front and rear of the tent to collapse the top cover portion to the bottom cover portion and the two portions are then suitably secured using latches, for example.

The embodiment optionally includes a display with hinges that enable the display or a screen to be folded parallel to the roof for storage and moved down for viewing purposes. The hinges allow the display to be in a number of viewing angles. If a screen is used, it can simply be hooked to a ceiling point and be dropped down when used.

Another embodiment facilitates a rooftop tent or a storage area for holding skis or luggage below the antenna. Additionally, a custom soft box may be utilized for storage, and easily removed when not in use. Alternatively, an antenna may be packaged on top of a roof box carrier to allow constant TV reception and storage below in the box.

In one aspect, a mobile expandable home system includes upper and lower cover portions, hinges coupled to a plurality of corner points on the upper cover portion to expand the portions into a shelled tent, and a satellite dish mounted to the upper cover portion to provide internet access through a satellite. The vehicle can be a car, truck, RV, train, boat, submarine with a float-mounted antenna, drone, or plane, for example. The antenna can be a mobile phased array antenna system mounted on the tent or suitable mobile platform and configured for communication with a satellite that emits or receives radio frequency (RF) signals and has a repeating ground track in a first direction, the antenna system including: a phased array antenna mounted on the mobile platform including a plurality of antenna elements distributed in a plurality of M columns oriented in the first direction and a plurality of N rows extending in a second direction normal to the first direction, and a plurality of fixed phase shifters aligned for phase offsets between antenna elements in the first direction.

3D Printed Antenna

Figure 5A:
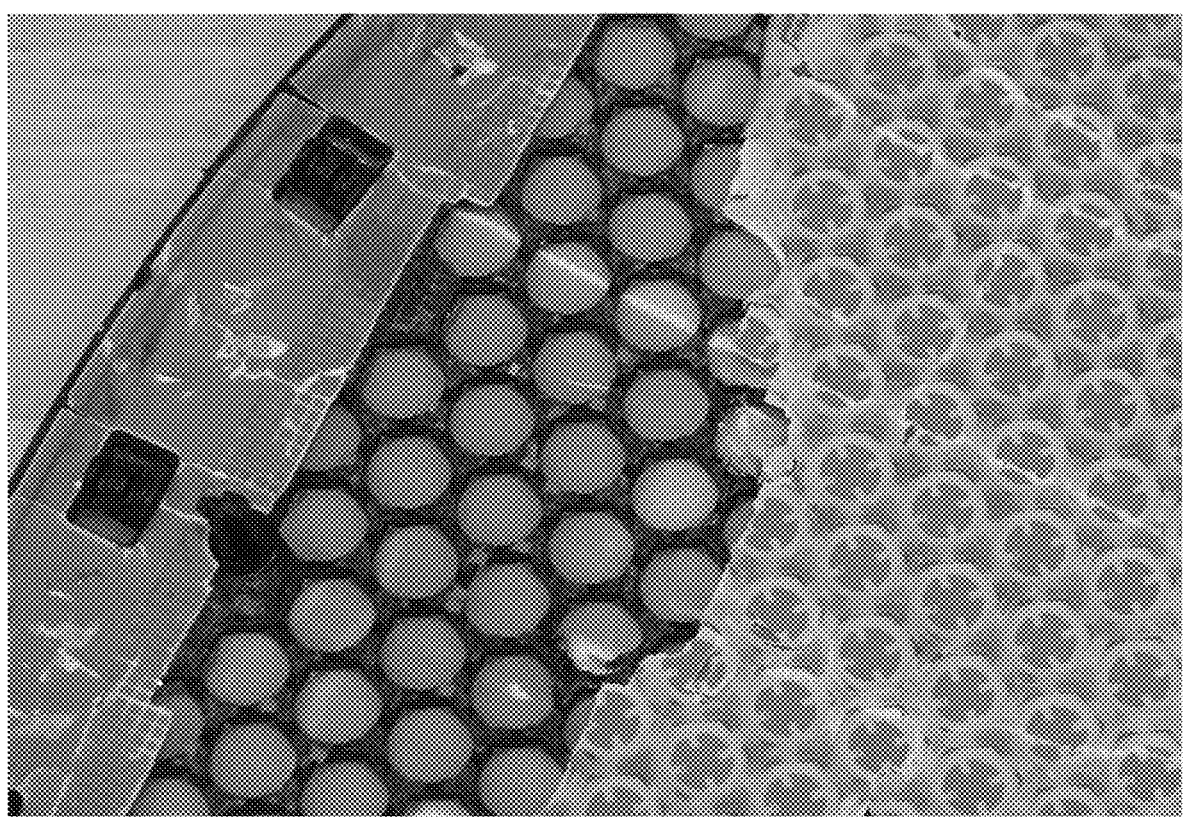
FIGS. 5A-5B show exemplary 3D printed satellite antennas.
Figure 5B:
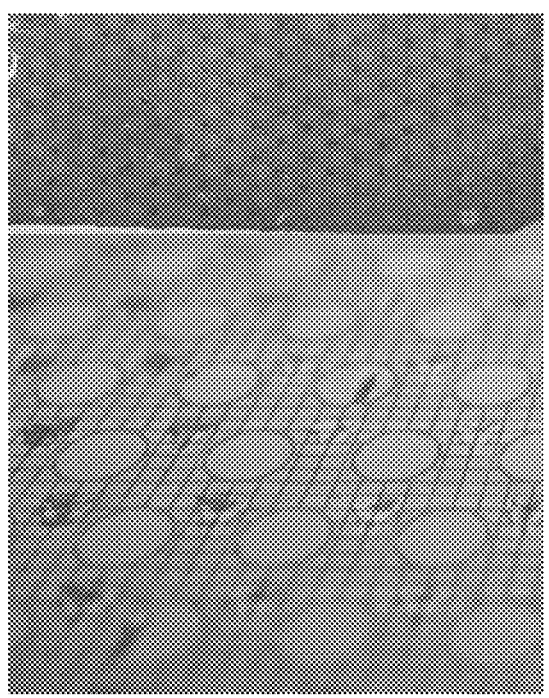
Figure 5C:
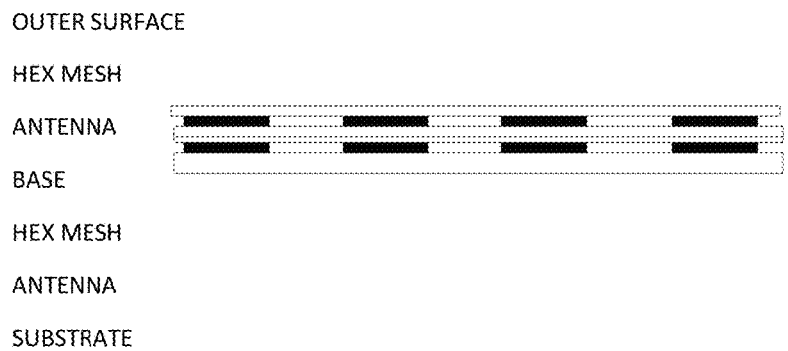

FIGS. 5A-5C show top, bottom, and cross sectional views of an exemplary 3D printed antenna with low profiles. Such low profile 3D printed antenna can improve aerodynamic profiles for high speed planes, cars, or trains, the antenna can be mounted or printed on a satellite facing surface (such as top side). The antenna is a 3D printed phased array antenna system configured for communication with a satellite that emits or receives radio frequency (RF) signals and has a repeating ground track in a first direction, the antenna system including a phased array antenna printed on the mobile platform including a plurality of antenna elements distributed in a plurality of M columns oriented in the first direction and a plurality of N rows extending in a second direction normal to the first direction. A plurality of fixed phase shifters are connected to the 3D printed antennas which are aligned for phase offsets between antenna elements in the first direction.

Another embodiment uses 3D printed Luneburg lens high-gain radio antenna. A passive beam steering can be used with a 3D printed hemispherical graded dielectric beamforming lens above an array of antenna feeds that are connected to beam forming circuits. The lens is made of ceramic to allow for wide-angle beam steering at mmWave frequencies. The Luneburg antenna uses the lens rather than a parabolic reflector as the main focusing element. As with the dish antenna, a feed to the receiver or from the transmitter is placed at the focus, the feed can be a horn antenna. Because the lens is spherically symmetric, the antenna can be steered by moving the feed around the lens, without having to bodily rotate the whole antenna. Again, because the lens is spherically symmetric, a single lens can be used with several feeds looking in widely different directions. In contrast, if multiple feeds are used with a parabolic reflector, all must be within a small angle of the optical axis to avoid suffering coma (a form of de-focusing). A variation on the Luneburg lens antenna is the hemispherical Luneburg lens antenna or Luneburg reflector antenna. This uses just one hemisphere of a Luneburg lens, with the cut surface of the sphere resting on a reflecting metal ground plane. The arrangement halves the weight of the lens, and the ground plane provides a convenient means of support. However, the feed does partially obscure the lens when the angle of incidence on the reflector is less than about 45°.

Folding Computer or Tablet

Figure 6A:
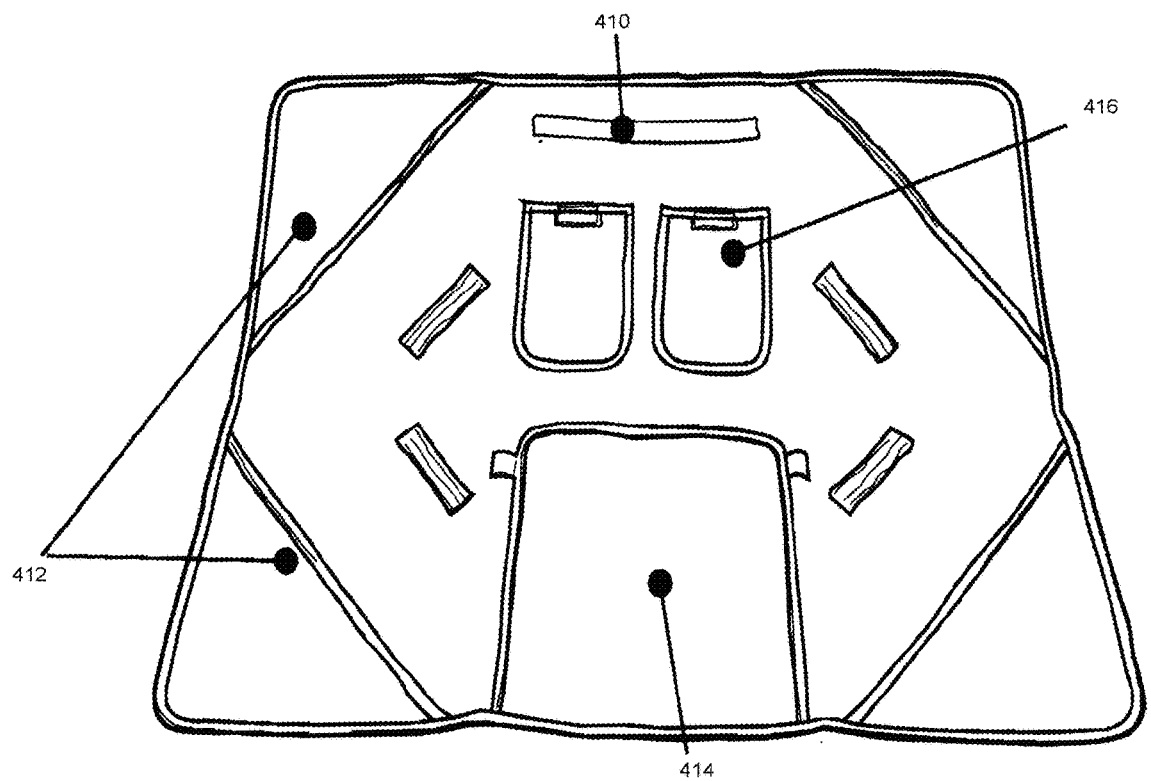
Figure 6B:
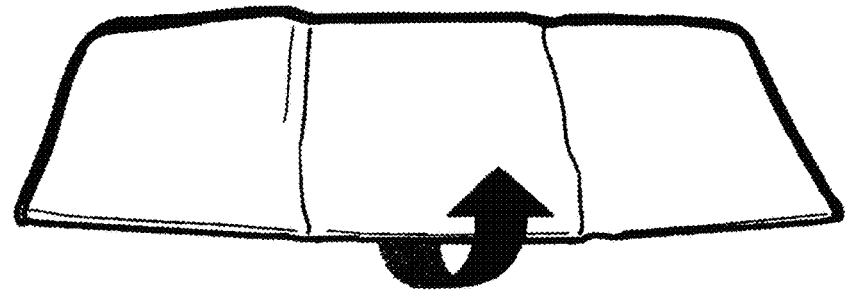
Figure 6B:
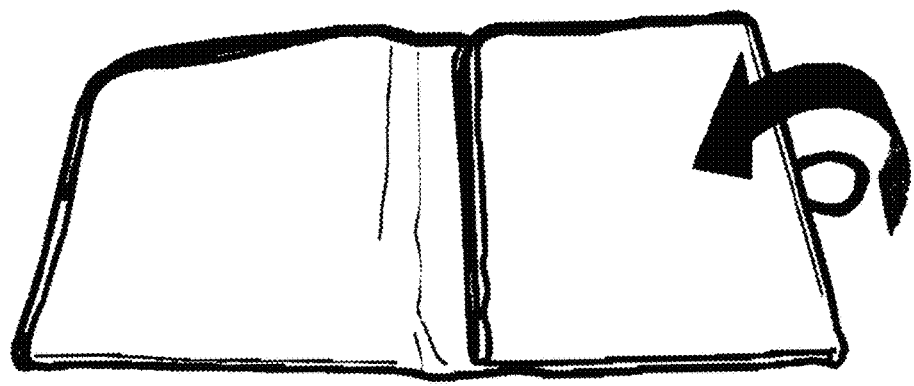
Figure 6B:
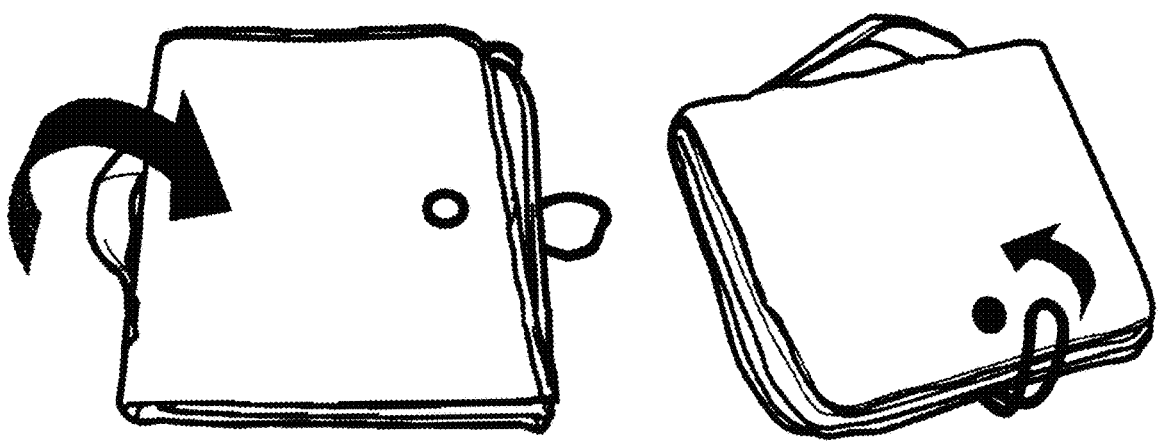
Figure 6C:
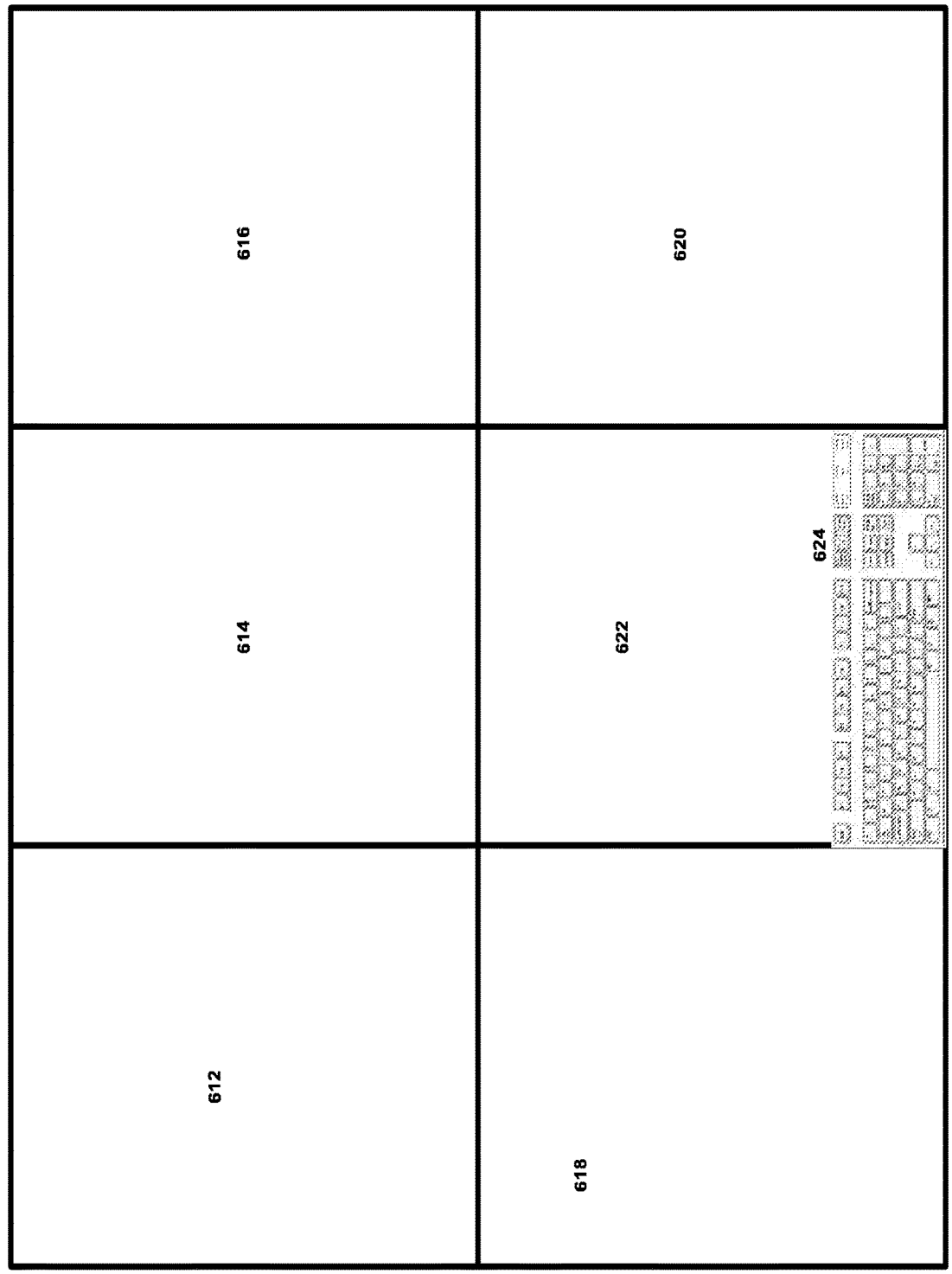

FIGS. 6A-6C show exemplary folding of a work surface into a compact carrying folder where one side is a satellite antenna and the other side is a flexible display with voice recognition and visual recognition and touch screen. First, the user takes the bottom of the workstation and folds to the top of the workstation and the right flap can folded over to the middle region. The user folds the left flap over to the middle region. The user can attach a string to the outer button. Other alternative securing methods can be used, including a Velcro strap in place of the string, a lock, or a zipper around the flaps. In this system, a multi-core processor and graphic processing unit (GPU) device is used. The device is connected over a bus to memory, keyboard, wireless transceiver, cellular transceiver 108, and a plurality of display panels 110. The memory can be flash memory that acts as a solid state disk drive for the workstation. In one embodiment, the keyboard is a physical keyboard (as opposed to a screen based keyboard) that provides tactile feedback to the user, the wireless transceiver 16 is a WiFi or 802.XX type transceiver, the cellular transceiver is a 5G/6G/satellite modem, and the display panels are E-ink panels.

In one embodiment, a method to provide user input to a mobile device having a camera therein, includes:
  detecting a gesture formed by one or more body parts with the camera;

converting the detected gesture into a requested user input; and executing the requested user input and providing results to the user.

The method includes detecting a four-finger swipe from side to side in order to switch and open apps, swiping up with four fingers to open an application switcher, or using a five-finger pinch to return to a home screen. The method includes detecting a gesture with two or more fingers simultaneously in the air. The method includes detecting pinching or stretching gestures in the air to control zooming. The method includes waving a hand up or down in the air to scroll a display. The method includes moving a finger in the air to scroll a display. The method includes tapping a finger in the air to click. The method includes clicking or tapping with two fingers in the air to perform a secondary click. The method includes performing a double tap in the air to look up information. The method includes detecting gestures formed by one or more hands in the air to explain spatial ideas. The method includes tracing shapes with fingers in the air. The method includes capturing a user's gesture in the air with the camera. The includes detecting swiping with two or three fingers to move between pages of a document. The method includes swiping with three or four fingers to move between full-screen applications. The method includes displaying a launchpad by pinching in the air with thumb and three fingers. The method includes showing a desktop when a thumb and three fingers are spread in the air. The method includes detecting user intent based on gaze tracking. The method includes detecting eye movement to select a user interface item. The method includes detecting eye blink to select a user interface item. The method includes detecting eye movement and hand movement to perform a graphical user interface (GUI) control.

The flexible computer includes a foldable flexible low power display with surfaces 612-620. The surfaces can be folded like a newspaper during travel and unfolded to provide a large display surface for the user to work on. The flexible computer includes a keyboard 624 that can be a physical keyboard or a virtual keyboard. For gesture recognition, cameras 630 are positioned on opposite sides angles alpha and beta. The user can place his or her hand or finger to a position, and the camera can capture the finger position and allow gestures to be made in the air and recognized as discussed above. The surfaces can have a zipper that secures the contents in a pocket under the display surface. As shown in FIGS. 6B, the surfaces can be folded up compactly as a digital portfolio carrier or a digital wallet. First, the user takes the bottom of the workstation and folds to the top of the workstation and the right flap is folded over to the middle region. Next, the user folds the left flap over to the middle region. To secure the portfolio, the user can attach a string to the outer button. Other alternative securing methods can be used, including a Velcro strap in place of the string, a lock, or a zipper around the flaps.

In one implementation, a method for increasing mobile processing power on a mobile device with a general purpose processor and one or more graphic processing units (GPUs) to accelerate graphic rendering on a screen includes separating general purpose software into parallelizable portions; running one or more parallelizable portions on one or more GPUs; and collecting GPU results.

The system can use GPUs for recognition of gestures in the air.

The system can use GPUs for eye tracking on the phone.

The system can use GPUs for electrocardiogram analysis on the phone.

The system can use GPUs for augmented reality on the phone.

The system can use GPUs for Doppler radar processing on the phone.

In one embodiment, the system can do on-the-fly augmented reality processing. For example, the system can auto translate signs from one language to another. First, the GPU identifies the letters on the sign. Next, it calculates their rotation and the perspective from which the viewer is seeing them. Then it tries to recognize each letter by consulting a library of reference font sets. A string of letters is generated, and a probabilistic word recognition is done. Upon recognizing the word, the system generates a synthetic version with the translation in the sign. The original language is erased and the existing orientation, foreground, and background color, which may be a gradient [rather than a constant color] are used to put new text on top.

In another embodiment, the computer (with or without the GPU) can work with eye gazing as a form of user input. In one embodiment, a method to provide user input to a mobile device having a camera therein to capture eye movements includes tracking eye movement to detect a user request;

converting the user request into a requested user input; and executing the requested user input and providing results to the user.

The system can determine user intent based on gaze tracking. The system can detect eye movement to select a user interface item. The system can detect eye blink to select a user interface item. The system can detect eye movement and hand movement to perform a graphical user interface (GUI) control. The system can calibrate the camera by taking a picture of a left or right eye. The system includes calibrating the eye indoors and outdoors. The system can identify a person's eye at predetermined distances and under different lighting conditions during a learning phase. The system can track an eye position relative to a screen rather than where a person is looking. The system can form a virtual box around an image of the eye, and recognize the eye inside the virtual box. The system can divide a camera image into a plurality of regions and locating the eye in one region. The system can authenticate the user with the eye movement. The system can detect eye movements following a moving icon around a screen. The system can detect one or more kinetic features unique to the user. During training, the system can move an icon across a screen to elicit distinct characteristics associated with the user. The icon can be moved rapidly to activate a predetermined sequence of eye movements;

the icon can be moved smoothly or slowly to activate a second predetermined sequence of eye movements; and the eye movements are captured by the camera. The system can detect a four-finger swipe from side to side in order to switch and open apps, swiping up with four fingers to open an application switcher, or using a five-finger pinch to return to a home screen. The system can detect a gesture with two or more fingers simultaneously in the air. The method includes one of:

display;

detecting pinching or stretching gestures in the air to control zooming;

waving a hand up or down in the air to scroll a display or moving a finger in the air to scroll a tapping a finger in the air to click;

clicking or tapping with two fingers in the air to perform a secondary click;

performing a double tap in the air to look up information;
detecting gestures formed by one or more hands in the air to explain spatial ideas;
tracing shapes with fingers in the air;
swiping with two or three fingers to move between pages of a document;
swiping with three or four fingers to move between full-screen applications;
displaying a launchpad by pinching in the air with thumb and three fingers; or showing a desktop when a thumb and three fingers are spread in the air.

In one aspect:
1. A mobile device, comprising:
   a foldable surface having one or more pockets therein to store objects;
   a foldable satellite antenna coupled to the foldable surface; and
   one or more flexible electronic displays mounted on the foldable surface.
2. The mobile device of claim 1, wherein the foldable surfaces form a wallet or an organizer.
3. The mobile device of claim 1, comprising processor coupled to the displays to render information for a user.
4. The mobile device of claim 1, comprising a wireless transceiver coupled to the displays to communicate data.
5. The mobile device of claim 4, wherein the wireless transceiver comprises an 802 transceiver or a cellular transceiver.
6. The mobile device of claim 1, comprising a near field communication module coupled to the flexible display.
7. The mobile device of claim 1, comprising a physical keyboard or a virtual keyboard to input data.
8. The mobile device of claim 1, comprising one more cameras coupled to the flexible display.
9. The mobile device of claim 8, wherein the camera performs keyboard input or recognizes hand gesture.
10. The mobile device of claim 1, comprising a mobile payment system to share payments among a group of payers.
11. A wallet, comprising:
    a foldable surface having one or more pockets therein to store objects; and
    one or more flexible electronic displays mounted on the foldable surface.
12. The wallet of claim 11, comprising processor coupled to the displays to render information for a user.
13. The wallet of claim 11, comprising a wireless transceiver coupled to the displays to communicate data.
14. The wallet of claim 11, comprising a physical keyboard or a virtual keyboard to input data.
15. The wallet of claim 11, comprising one more cameras coupled to the flexible display.
16. The wallet of claim 15, wherein the camera performs keyboard input or recognizes hand gesture.
17. The wallet of claim 11, wherein the wireless transceiver comprises an 802 transceiver or a cellular transceiver.
18. The wallet of claim 11, comprising a mobile payment system to share payments among a group of payers.
19. The wallet of claim 11, comprising a social network in communication with the display.
20. The wallet of claim 11, comprising a near field communication (NFC) module coupled to the flexible display.
21. The wallet of claim 11, comprising a near field communication (NFC) module coupled to the flexible display, a mobile payment system to share payments among a group of payers proximally positioned to each other.

Channel Bonding

The system can communicate with multiple satellites to increase bandwidth by bonding channels to transmit and/or receive data. Channel bonding is used in some embodiments to provide efficient usage of the wireless broadband bandwidth resulting in increased throughput. Channel bonding is an aggregation of multiple channels at the open systems interconnection (OSI) level 3 (network communications). If a single channel is overloaded and begins to slow down, bonding the channel with adjacent channels into a "bonding group" will allow data to be transmitted on the combined channel and thus work through any slowdowns or data congestion. However, once a bonding group is formed, fewer channels and bandwidth will remain for other users. The bonding or "aggregation" of the channels occurs between the router and the satellite. In alternative embodiments, the bonding may occur between the router and a ground-based server. In practice, the channels may be spread across several satellites.

One embodiment allows a first device to transmit information to a second device through two bonded satellites. The devices may be configured to communicate through a first satellite channel and a second satellite channel. In this implementation, each packet or communication unit of the data stream being communicated between the first and second devices are distributed between the first channel and the second channel. The system may allocate the first satellite for transmission and the second satellite for receiving data. Alternatively, the system may allow both satellites for reception or for transmission, depending on the workload. The system may allocate different channel bonding buffer sizes for each network type. Further, the system may determine the network buffer size based on attributes of the network type. The attributes may include bit rate, availability, signal strength, power consumption, or reliability. In addition, the first device may communicate with the second device to determine network types available to the second device for communication, as well as, preferences stored on the second device for receiving communication from the first device. In some implementations, the first device may determine that certain content is high priority content. The first device may identify high priority content, for example, based on data stored in the marker packet. In this scenario, the first device may choose to send a communication unit having a high priority content through a particular network type. For example, the first device may send high priority data through a specific network type that has a certain level of reliability, or at least the highest reliability of the available communication channels. Alternatively, the first device may be configured to send high priority communication units through multiple channels redundantly. As such, the communication unit may be sent through multiple different network types redundantly. High priority data may include information such as base layer packets or I-frame packets of video streams.

In one embodiment, a method for bonding channels may
Configure two or more satellites in a channel bonding group through a channel bonding application layer.
Get bit rate in the channel bonding group from the MAC abstraction layer and allocate bonding buffers for each channel.
Determine bonding characteristics such as the packet data types, the condition of each channel, and the buffer fullness for each channel.

Tag and assign packets to each channel based on the determined characteristics and assign packets adaptively based on any change in characteristics.

In another embodiment, a method for bonding channels may

Configure one or more satellites and one or more terrestrial transceivers in a channel bonding group through a channel bonding application layer.

Get bit rate in the channel bonding group from the MAC abstraction layer and allocate bonding buffers for each channel.

Determine bonding characteristics such as the packet data types, the condition of each channel, and the buffer fullness for each channel.

Tag and assign packets to each channel based on the determined characteristics and assign packets adaptively based on any change in characteristics.

In another embodiment, a method for bonding channels may

Configure one or more satellites, one or more airborne vehicles (planes/balloons) and one or more terrestrial transceivers (5G/6G) in a channel bonding group through a channel bonding application layer.

Get bit rate in the channel bonding group from the MAC abstraction layer and allocate bonding buffers for each channel.

Determine bonding characteristics such as the packet data types, the condition of each channel, and the buffer fullness for each channel.

Tag and assign packets to each channel based on the determined characteristics and assign packets adaptively based on any change in characteristics.

In another embodiment, a method for bonding channels may

Configure two or more satellites in a channel bonding group through a channel bonding application layer.

Get bit rate in the channel bonding group from the MAC abstraction layer and allocate bonding buffers for each channel.

Determine bonding characteristics such as the packet data types, the condition of each channel, and the buffer fullness for each channel.

Increase download speed by bonding two satellite receivers together.

Increase upload speed by bonding two satellite channels together by: receiving a first plurality of data beams of a first channel, generating an encoded digital first plurality of data beams by encoding each data beam of the first plurality of data beams with a respective time delay and phase; in response to receiving a second plurality of data beams of a second channel, generating an encoded digital second plurality of data beams by encoding each data beam of the second plurality of data beams with a respective time delay and phase; combining the encoded digital first plurality of data beams and the encoded digital second plurality of data beams to generate a combined channel having a bandwidth that is a function of a bandwidth of one or both of the first or second channel; applying digital-to-analog conversion to the combined channel signal to generate an analog combined channel signal; up converting the analog combined channel signal to generate a radio frequency (RF) signal based on the analog combined channel signal; and wirelessly transmitting the RF signal on an antenna included in a phased array antenna.

In one embodiment, the satellite transceiver includes a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; a channel combiner, electrically coupled to the first and second plurality of digital beamformers, and configured to generate a combined channel comprising an aggregation of at least a portion of the encoded first plurality of data beams and at least a portion of the encoded second plurality of data beams, wherein the combined channel has a bandwidth that is a function of a bandwidth of one or both of the first or second channel; and a radio frequency (RF) transmission section, electrically coupled to the channel combiner, and configured to generate an output signal to be provided to a transmitting antenna based on the combined channel, wherein the RF transmission section includes a digital-to-analog converter (DAC) and a mixer.

In another embodiment, the devices may be configured to communicate through a satellite channel and a terrestrial channel (such as 5G/6G channels). In this implementation, each packet or communication unit of the data stream being communicated between the first and second devices are distributed between the satellite and terrestrial channels via satellite networks and cellular networks, for example. Each network is controlled by the corresponding physical layer. Each physical layer is connected to a media access control layer (MAC). Often the MAC layer is software that controls the physical layer. The MAC layer often provides a common interface that is similar to other MAC layers. The interface allows for increased interchangeability between communications sent to each network type. The MAC abstraction layer may communicate and receive data through a channel bonding application layer. The channel bonding application layer may communication with the MAC abstraction layer through a channel bonding adaptation layer interface.

The channel bonding adaptation layer may determine communication unit and/or packet distribution and insert marker packets. Examples of techniques for distributing packets among communication channels are described throughout this application. Further, the channel bonding adaptation layer may determine packet distribution based on channel conditions, such as the bit rate of each channel. This information may be received from the MAC abstraction layer through the channel bonding application layer interface. The channel bonding adaptation layer may also configure the channel bonding group and adaptively send packets to different channels based on changing network conditions or characteristics of the data being passed.

In one aspect, a communication system includes:
a plurality of communication channels from a satellite network or a terrestrial network; and
processor configured to:
determine which of the communications channels to employ together as a bonded channel group;
selectively assign the source data to at least two communication channels of the bonded channel group for transmission over the satellite or terrestrial network based on a data type of a content of the source data, the data type comprising at least one of audio data, video data, or other types of data.

Each network is controlled by the corresponding physical layer and each physical layer is connected to a media access control layer (MAC) which controls the physical layer. The MAC layer often provides a common interface enabling increased interchangeability between communications sent to each network type.

Embodiments of the invention may include a wireless satellite communication device with two satellite antennas communicating with at least two satellites or a satellite and a non-orbital repeater. In one embodiment, each antenna may communicate with a single satellite and each using a different frequency. In another embodiment, the antennas may communicate with both satellites using the same frequency or overlapping frequencies and/or overlapping in time using MIMO, SIMO or MISO techniques. The communication channels can be from two satellites, a satellite and a terrestrial transceiver, and a satellite and a 5G/6G transceiver, for example.

The bonding can be done for transmission only, transmission and reception, or reception only. The multiple individual communication channels within the bonded channel group provide an aggregate amount of bandwidth, which may be less than, equal to, or in excess of the aggregate bandwidth of the bonded system.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

While illustrative embodiments have been illustrated and described, it will be appreciated that various changes can be made therein without departing from the spirit and scope of the present disclosure.

There have been described and illustrated herein several embodiments of a low profile mobile satellite antenna system. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

The invention claimed is:

1. A global communication system, comprising:
a mobile portion adapted to move in a first direction;
a phased-array antenna attached to the mobile portion;
a motor actuator to move the antenna in one direction to face a satellite, wherein the mobile portion and the motor actuator in combination position the antenna to receive signals from the satellite;
a first transceiver to communicate with the satellite; and
a processor controlling the motor actuator to optimize communication from the first transceiver.

2. The system of claim 1, wherein the mobile portion comprises a backpack portion, a vehicle portion, a moveable tent portion, a cell phone, a personal communicator, a hat, a watch, skin, clothing, or a wearable portion.

3. The system of claim 1, wherein the actuator comprises a motor, a hydraulic actuator, or an inflatable chamber.

4. The system of claim 1, wherein the antenna comprises a substrate, comprising a solar panel above, under, or planarly adjacent the antenna.

5. The system of claim 1, wherein the phase-array antenna comprises a transparent material.

6. The system of claim 1, comprising a plastic cover, a rain cover, or a water-repellant material to protect said antenna.

7. The system of claim 1, comprising a local area network to allow local devices to access the Internet.

8. The system of claim 7, wherein the local area network comprises a local area network (LAN) or personal area network (PAN).

9. The system of claim 1, comprising a lens or a reflector to focus energy on the antenna.

10. The system of claim 1, comprising a second transceiver to communicate with a second satellite, and channel bonding code to increase communication speed with two satellites.

11. The system of claim 1, comprising code to bond communication channels together to increase communication speed.

12. The system of claim 1, comprising a terrestrial transceiver to communicate with a cellular base, and channel bonding code to increase communication speed using a combination of terrestrial and satellite communication.

13. The system of claim 1 wherein the antenna is mounted to a roof of a vehicle, wherein the actuator mechanically moves the phased array antenna in one dimension and communicate with a satellite constellation that emits or receives radio frequency (RF) signals and has a repeating ground track in a first direction, the antenna including a plurality of antenna elements distributed in a plurality of M columns oriented in the first direction and a plurality of N rows extending in a second direction normal to the first direction, and a plurality of phase shifters aligned for phase offsets between antenna elements in the first direction; wherein the antenna enhances gain in a second direction of radio frequency signals received by and emitted from the phased array antenna.

14. The system of claim 1, comprising a terrestrial transceiver and a second transceiver to communicate with a second satellite, and channel bonding code to increase communication speed with a plurality of satellites and terrestrial communication.

15. The system of claim 1, comprising an inflator coupled to the antenna to form an inflatable antenna.

16. The system of claim 1, wherein the mobile portion comprises an autonomous vehicle, a robot, a drone.

17. The system of claim 1, comprising a mesh network transceiver coupled to the processor.

18. A method for mobile communication, comprising:
securing a phased-array antenna to a mobile portion;
moving the antenna in one direction with a motorized actuator to face a satellite, wherein the mobile portion and the motor actuator in combination position the antenna to receive signals from the satellite;
communicate with the satellite and controlling the actuator to optimize communication from one or more transceivers.

19. The method of claim 18, wherein the mobile portion comprises a backpack portion, a vehicle portion, a moveable tent portion, a hat, a cell phone, a personal communicator, a watch, a skin, clothing, or a wearable portion.

20. The method of claim 18, comprising mounting the antenna to a roof of a vehicle, wherein the actuator mechanically moves the phased array antenna in one dimension and communicate with a satellite constellation that emits or receives radio frequency (RF) signals and has a repeating ground track in a first direction, further comprising identifying a repeating ground track of the satellite constellation in a first direction; orienting a phased array antenna in the first direction, the antenna including a plurality of antenna elements distributed in a plurality of M columns oriented in the first direction and a plurality of N rows extending in a second direction normal to the first direction, and a plurality of phase shifters aligned for phase offsets between antenna elements in the first direction; enhancing gain in the second direction of radio frequency signals received by and emitted from the phased array antenna; and receiving and/or emitting RF signals between the satellite constellation and the antenna.

* * * * *